US011651316B2

(12) United States Patent
Allen

(10) Patent No.: US 11,651,316 B2
(45) Date of Patent: May 16, 2023

(54) CONTROLLING VEHICLES USING CONTEXTUAL DRIVER AND/OR RIDER DATA BASED ON AUTOMATIC PASSENGER DETECTION AND MOBILITY STATUS

(71) Applicant: Allstate Insurance Company, Northbrook, IL (US)

(72) Inventor: Rachel Edelshteyn Allen, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/650,080

(22) Filed: Jul. 14, 2017

(65) Prior Publication Data
US 2019/0019122 A1 Jan. 17, 2019

(51) Int. Cl.
*G06Q 10/06* (2023.01)
*G06Q 10/0639* (2023.01)
(Continued)

(52) U.S. Cl.
CPC ......... *G06Q 10/0639* (2013.01); *B60W 40/09* (2013.01); *G06Q 10/063* (2013.01); *G06Q 50/30* (2013.01); *G06Q 10/06311* (2013.01)

(58) Field of Classification Search
CPC .. G06Q 10/0639; G06Q 10/063; G06Q 10/02; B60W 40/06; B60W 40/09; H06Q 50/30; A63B 2071/068
See application file for complete search history.

(56) References Cited

U.S. PATENT DOCUMENTS 6,633,841 B1 * 10/2003 Thyssen .................. G10L 25/78
375/243
6,925,425 B2 * 8/2005 Remboski ............ G07C 5/0808
702/182
(Continued)

FOREIGN PATENT DOCUMENTS

WO 2015134339 A1 9/2015
WO 2016028228 A1 2/2016
WO WO-2017192726 A1 * 11/2017 ....... G06Q 10/06393

OTHER PUBLICATIONS

Michael Carney, Uber continues to screw its "partners," now by forcing Uber Black drivers to accept UberX fares Sep. 4, 2014 https://pando.com/2014/09/04/uber-continues-to-screw-its-partners-now-by-forcing-uber-black-drivers-accept-uberx-fares/ (Year: 2014).*
(Continued)

*Primary Examiner* — Patricia H Munson
*Assistant Examiner* — Hamzeh Obaid
(74) *Attorney, Agent, or Firm* — Polsinelli PC

(57) ABSTRACT

A system may receive driving information associated with a first driver of a shared mobility service, the driving information comprising processed sensor data received from one or more sensors of a vehicle associated with the first driver. Subsequently, the system may determine, based on at least one of recorded audio signals and a wireless signal, one or more time periods during which the first driver was transporting at least one passenger of the shared mobility service. Thereafter, the system may determine, based on correlating the driving information with the one or more time periods, a first score for the first driver. Then, the system may transmit a notification of a ride opportunity to the first driver responsive to determining that the first score for the first driver is higher than a second score for a second driver.

19 Claims, 11 Drawing Sheets

(51) Int. Cl.
  *G06Q 10/063*   (2023.01)
  *B60W 40/09*    (2012.01)
  *G06Q 50/30*    (2012.01)
  *G06Q 10/0631*  (2023.01)

(56) References Cited

U.S. PATENT DOCUMENTS

| | | |
|---|---|---|
| 7,080,019 B1 | 7/2006 | Hurzeler |
| 7,941,267 B2 | 5/2011 | Adamczyk et al. |
| 8,036,824 B2 | 10/2011 | Huang et al. |
| 8,055,534 B2 | 11/2011 | Ashby et al. |
| 8,140,256 B1 | 3/2012 | dos-Santos et al. |
| 8,452,273 B1 | 5/2013 | Khomenko et al. |
| 8,498,953 B2 | 7/2013 | Lehmann et al. |
| 8,559,914 B2 | 10/2013 | Jones |
| 8,566,126 B1 | 10/2013 | Hopkins, III |
| 8,688,532 B2 | 4/2014 | Khunger et al. |
| 8,737,951 B2 | 5/2014 | Jones et al. |
| 8,805,707 B2 | 8/2014 | Schumann, Jr. et al. |
| 9,049,558 B2 | 6/2015 | Jones et al. |
| 9,086,948 B1 | 7/2015 | Slusar et al. |
| 9,104,535 B1 | 8/2015 | Brinkmann et al. |
| 9,157,748 B2 | 10/2015 | Millspaugh |
| 9,361,599 B1 | 6/2016 | Biemer et al. |
| 9,373,201 B2 | 6/2016 | Jefferies et al. |
| 9,499,128 B2 | 11/2016 | Reh et al. |
| 10,147,325 B1 | 12/2018 | Copeland et al. |
| 2010/0035632 A1* | 2/2010 | Catten ............ H04W 24/08 455/456.1 |
| 2010/0042549 A1 | 2/2010 | Adamczyk et al. |
| 2011/0153629 A1 | 6/2011 | Lehmann et al. |
| 2012/0066007 A1 | 3/2012 | Ferrick et al. |
| 2014/0089399 A1 | 3/2014 | Chun et al. |
| 2014/0108058 A1 | 4/2014 | Bourne et al. |
| 2014/0200737 A1* | 7/2014 | Lortz ............ B60R 16/037 701/1 |
| 2015/0019266 A1 | 1/2015 | Stempora |
| 2015/0025917 A1 | 1/2015 | Stempora |
| 2015/0120336 A1 | 4/2015 | Grokop et al. |
| 2015/0204684 A1 | 7/2015 | Rostamian et al. |
| 2016/0171521 A1* | 6/2016 | Ramirez ............ B60K 35/00 701/409 |
| 2016/0198306 A1 | 7/2016 | Miles et al. |
| 2016/0364812 A1 | 12/2016 | Cao |
| 2016/0364823 A1 | 12/2016 | Cao |
| 2017/0138749 A1* | 5/2017 | Pan ............ G01C 21/3438 |
| 2017/0186324 A1 | 6/2017 | Fish et al. |
| 2017/0193419 A1* | 7/2017 | Haparnas ............ H04L 67/12 |
| 2017/0200321 A1 | 7/2017 | Hummel et al. |
| 2017/0215031 A1* | 7/2017 | Harding ............ G01C 21/3667 |
| 2017/0316533 A1 | 11/2017 | Goldman-Shenhar et al. |
| 2017/0365007 A1 | 12/2017 | Huls |
| 2018/0004211 A1 | 1/2018 | Grimm et al. |
| 2018/0033058 A1 | 2/2018 | Mukherjee et al. |
| 2018/0089605 A1 | 3/2018 | Poornachandran et al. |
| 2018/0093631 A1 | 4/2018 | Lee et al. |
| 2018/0267557 A1 | 9/2018 | Yan |
| 2018/0342033 A1* | 11/2018 | Kislovskiy ......... G01C 21/3697 |

OTHER PUBLICATIONS

Michael Carney, Uber continues to screw its "partners," now by forcing Uber Black drivers to accept UberX fares Sep. 4, 2014 https://pando.com/2014/09/04/uber-continues-to-screw-its-partners-now-by-forcing-uber-black-drivers-accept-uberx-fares/ (Year: 2014) (Year: 2014).*

Ellen Huet, Uber Tests Taking Even More From Its Drivers With 30% Commission May 18, 2015 https://www.forbes.com/sites/ellenhuet/2015/05/18/uber-new-uberx-tiered-commission-30-percent/#5ee5b0a043f6 (Year: 2015).*

Chu, Hon Lung, et al. "In-vehicle driver detection using mobile phone sensors."ACM MobiSys. 2011. (Year: 2011).*

Feld, Michael, Tim Schwartz, and Christian Müller. "This is me: Using ambient voice patterns for in-car positioning." International Joint Conference on Ambient Intelligence. Springer, Berlin, Heidelberg, 2010. (Year: 2010).*

Oct. 1, 2018—(WO) International Search Report & Written Opinion—PCT/US18/041956.

"Ridesharing Insurance—FAQs for Rideshare Drivers", dowloaded Feb. 8, 2017 from https://www.geico.com/information/aboutinsurance/ridesharing/faq/, 4 pages.

"Seamless Protection for Rideshare Drivers", downloaded Feb. 8, 2017 from https://www.farmers.com/carideshare/, 4 pages.

"Progressive Rideshare Insurance," downloaded Feb. 8, 2017 from http://rideshareinsurance.conm/rideshare-insurance-company/progressive-rideshare-insurance/, 6 pages.

"StateFarm Introduces Transportation Network Company Driver Coverage", downloaded Feb. 8, 2017 from https://www.statefarm.com/about-us/newsroom/2016/01/18/transportation-network-company-driver-coverage, 3 pages.

"Insurance for taxi drivers, tailored to you", downloaded Feb. 8, 2017 from http://www.simplybusiness.co.uk/insurance/taxi-driver/, 7 pages.

Apr. 2, 2019—(WO) International Search Report and Written Opinion—PCT/US2018/068137.

Apr. 30, 2019—U.S. Non-Final Office Action—U.S. Appl. No. 16/050,905.

Oct. 16, 2019—U.S. Non-Final Office Action—U.S. Appl. No. 16/050,850.

Oct. 29, 2019—U.S. Final Office Action—U.S. Appl. No. 16/050,905.

May 7, 2020—U.S. Non-Final Office Action—U.S. Appl. No. 16/050,905.

Ellen Huet, Uber Tests Taking Even More From It's Drivers With 30% Commission May 18, 2015 https://www.forbes.com/sites/ellenhuet/2015/05/18/uber-new-uberx-tiered-commission-30-percent/#5ee5b0a04316 (Year: 2015).

Jun. 11, 2020—U.S. Final Office Action—U.S. Appl. No. 16/050,850.

Sep. 23, 2020—U.S. Final Office Action—U.S. Appl. No. 16/050,905.

Dec. 29, 2021—U.S. Non-Final Office Action—U.S. Appl. No. 16/050,850, 52 Pages.

Jun. 15, 2022—U.S. Final Office Action—U.S. Appl. No. 16/050,850, 46 Pages.

Guidotti R, Nanni M, Rinzivillo S, Pedreschi D, Giannotti F. Never drive alone: Boosting carpooling with network analysis. Information Systems. Mar. 1, 2017;64:237-57. (Year: 2017).

* cited by examiner

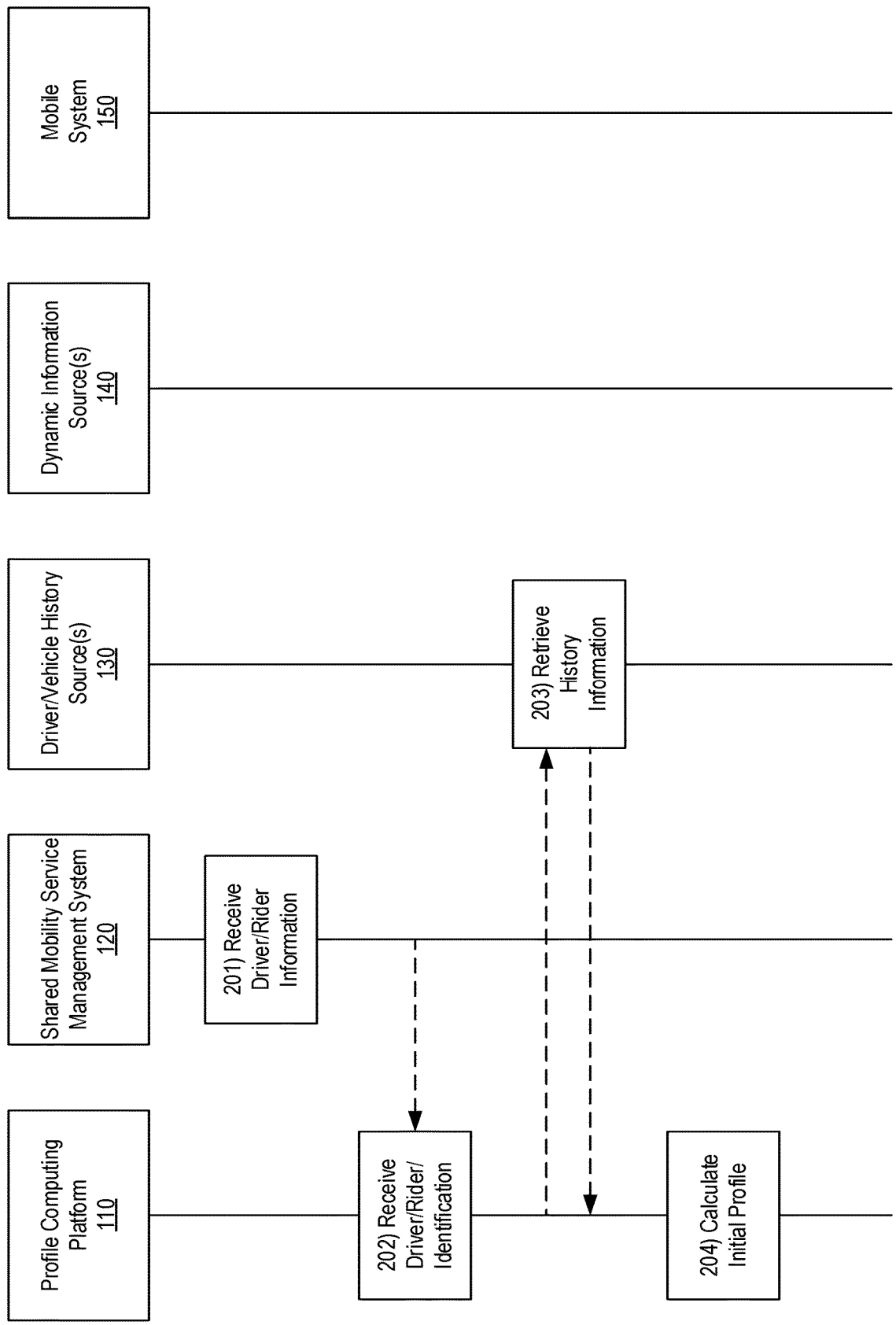

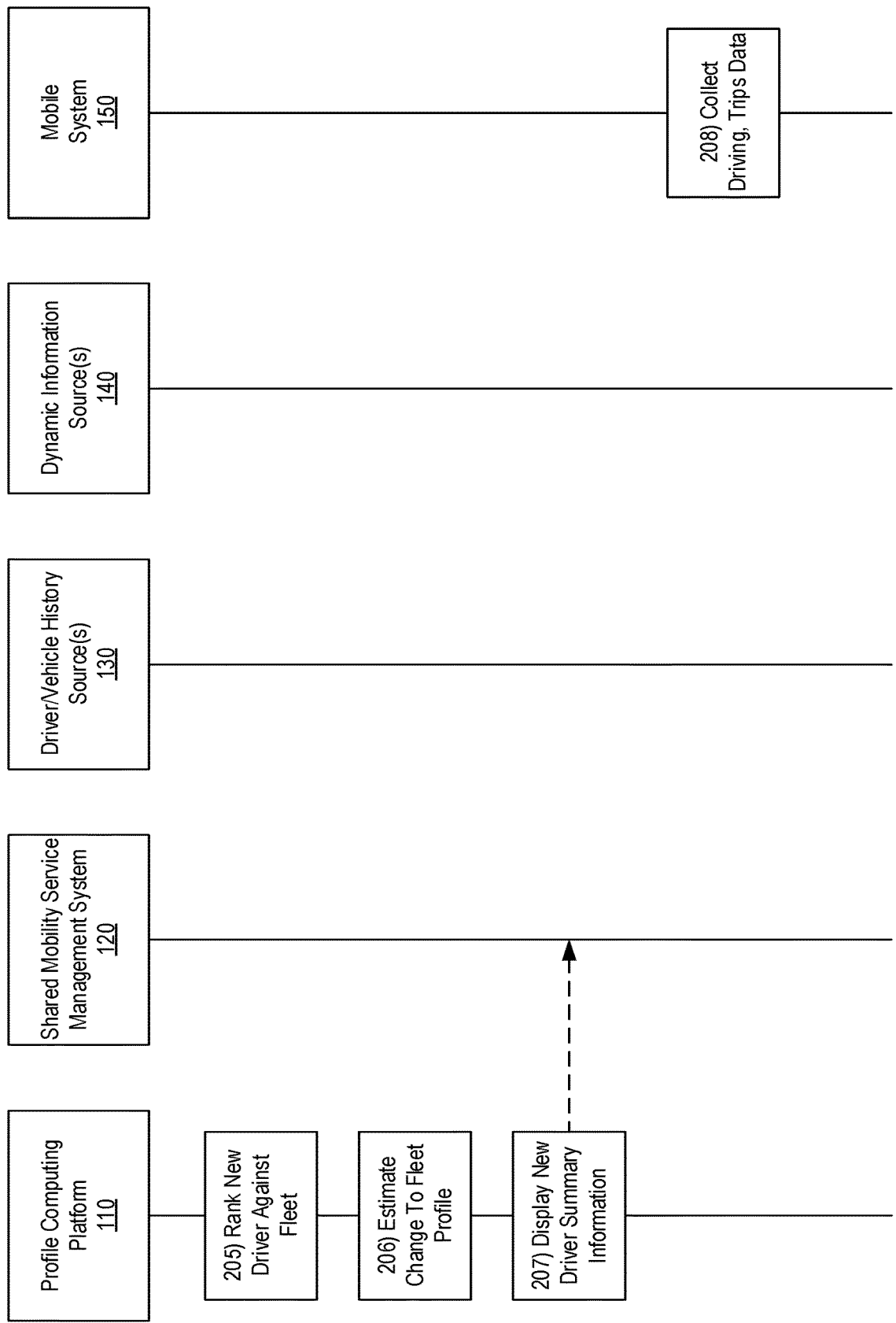

New Driver Estimate

Driver Name: First M. Last
Attributes: Cautious Driver, Conscientious

This driver has a higher rideshare score than average.
Adding this driver to the fleet may increase the fleet rideshare score by 1-2%
An insurance premium may reduce by up to 1%
This driver has a strong interest in movies, which is shared with 45% of riders.

Recommendation: Hire

*Decline*  *Approve*

FIG. 3

Passenger Presence Information

Based on voice signals, we detect 2 passengers in the car. Is this correct?  Yes  No Based on captured video, we detect 3 passengers in the car. Is this correct?  Yes  No Based on wireless signals, we detect 3 passengers in the car. Is this correct?  Yes  No

*Back*

FIG. 4

CONTROLLING VEHICLES USING CONTEXTUAL DRIVER AND/OR RIDER DATA BASED ON AUTOMATIC PASSENGER DETECTION AND MOBILITY STATUS

BACKGROUND

Aspects of the disclosure relate to controlling the operation of one or more vehicles of a shared mobility service, such as a rideshare service, car-share service, carpool service, peer to peer pickup service, and the like. Shared mobility services are becoming increasingly common as shared mobility services and applications continue to improve. Autonomous vehicles may further increase the utility and appeal of shared mobility services. Despite advances in various technologies, however, it may be difficult to effectively match riders with other riders and/or drivers (e.g., for shared mobility services that do not rely on autonomous vehicles). Such effective matching is hampered by lack of data about riders, drivers, and vehicles, especially when a new rider, driver, or vehicle first joins a shared mobility service. Additionally, it may be difficult for a shared mobility service to control vehicles of the shared mobility service to incentivize safe and effective operation, provide risk insurance that accounts for the needs of shared mobility services, and otherwise control operation of a shared mobility service.

SUMMARY

Aspects of the disclosure provide effective, efficient, scalable, and convenient technical solutions that address and overcome the technical problems associated with matching riders with other riders and/or drivers of a shared mobility service, particularly in instances in which riders and drivers vary in terms of their personal attributes and/or when drivers vary in terms of safe driving and other abilities.

In accordance with one or more embodiments, a computing platform having at least one processor, a memory, and a communication interface may receive driving information associated with a first driver of a shared mobility service. Subsequently, the computing platform may determine, based on at least one of recorded audio signals and a wireless signal, one or more time periods during which the first driver was transporting at least one passenger of the shared mobility service. Thereafter, the computing platform may determine, based on correlating the driving information with the one or more time periods, a first score for the first driver. Then, the computing platform may transmit a notification of a ride opportunity to the first driver responsive to determining that the first score for the first driver is higher than a second score for a second driver.

In some embodiments, the computing platform may also determine a safety score estimating the first driver's safety, determine a revenue score estimating the first driver's revenue, and combine the safety score with the revenue score to yield a composite score.

In some embodiments, the computing platform may determine the one or more time periods by analyzing the recorded audio signals to detect a voice of the at least one passenger. For example, the computing platform may analyze the recorded audio signals to detect a voice of the least one passenger by generating, from the recorded audio signals, a first voice print, comparing the first voice print to a second voice print associated with the driver, and determining, based on the comparison, that the first voice print does not match the second voice print. Additionally or alternatively, the computing platform may determine the one or more time periods by analyzing the wireless signal associated with a mobile device of the at least one passenger. The computing platform may also determine, for the one or more time periods, a number of passengers of the shared mobility service.

In some embodiments, the computing platform may determine that the first driver and the second driver are within a threshold distance of a pickup location associated with the ride opportunity. In some embodiments, the computing platform may determine, based on the first score, a percentage of a fare to award to the first driver.

In some embodiments, the computing platform may transmit, to a mobile system associated with the first driver, an indication of the first score and a recommendation for improving the first score.

In some embodiments, the computing platform may determine, based on the driving information, an attribute characterizing the first driver.

In some embodiments, the computing platform may increase, based on a determination that a rider associated with the ride opportunity is also associated with the attribute, a percentage of a fare awarded to the driver.

In some embodiments, the computing platform may determine a similarity between a first profile of a first rider associated with the ride opportunity and a second profile of a second rider already being transported by the first driver, determine, based on the similarity, a fare for the first rider.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for controlling vehicles in a shared mobility service based on scores and/or attributes in accordance with one or more example embodiments;

FIGS. 3 & 4 depict example graphical user interfaces for controlling vehicles in a shared mobility service based on scores and/or attributes in accordance with one or more example embodiments;

DETAILED DESCRIPTION

Figure 1A:
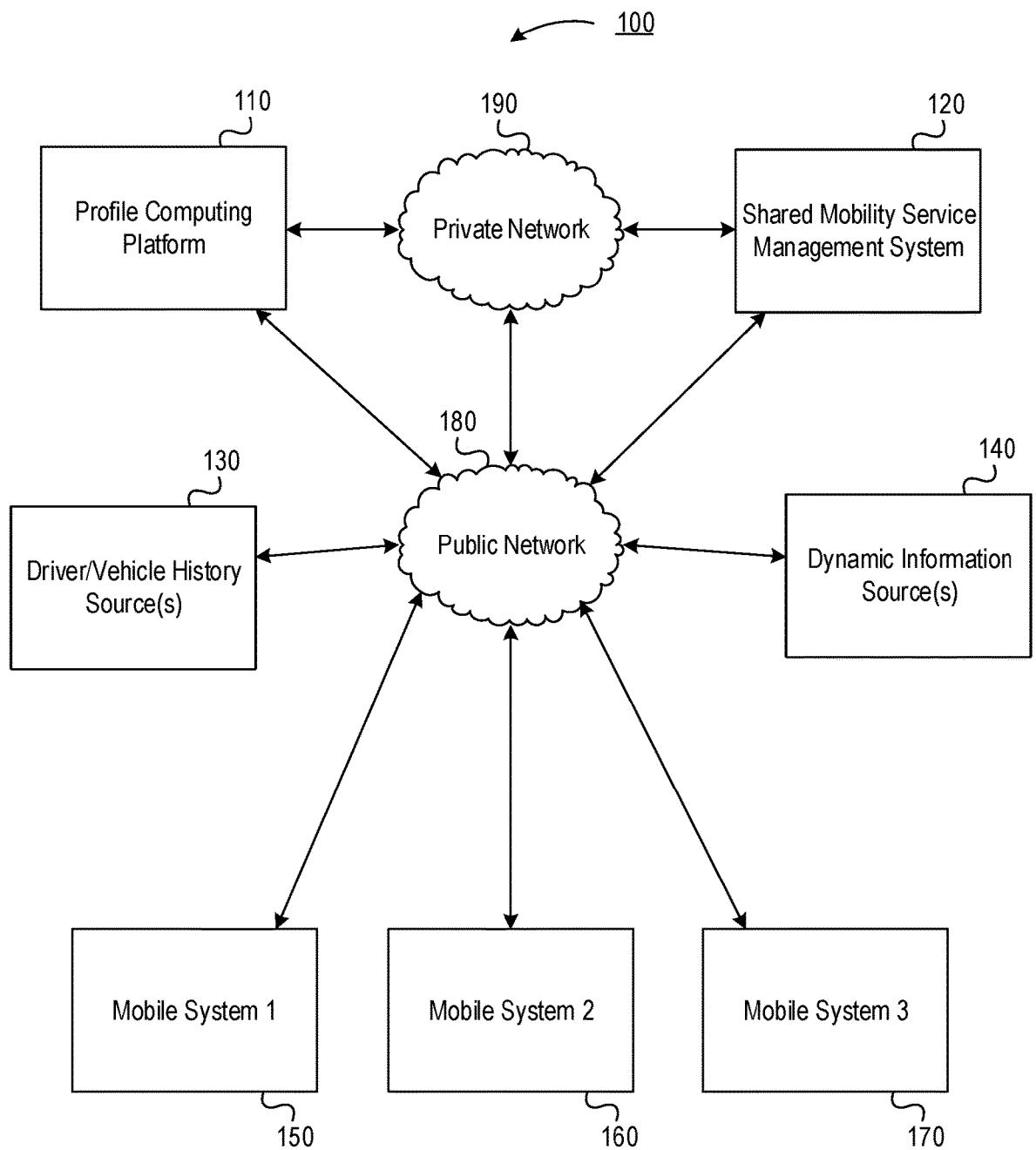
FIGS. 1A-1C depict an illustrative operating environment for controlling vehicles in a shared mobility service based on scores and/or attributes in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to controlling operation of a shared mobility service based on one or more profiles associated with drivers, passengers, and/or vehicles of a shared mobility service. A profile may include one or more attributes of the driver, passenger, and/or vehicle as well as one or more scores. A score for a driver may be calculated based on various contextual data characterizing, for example, a driver's history and record, driving habits, past performance as a shared mobility service driver (as indicated, for example, by various information captured by a shared mobility service application 153, including audio, video, and/or sensor information), online behavior, and the like. In some examples, the score may characterize one or more of a driver's safety and a revenue associated with the driver.

A score may also be calculated for a passenger based on various contextual data characterizing, for example, a passenger's driving history and record, driving habits, past performance as a rider (as indicated, for example, by various information captured by a shared mobility service application 153, including audio, video, and/or sensor information), online behavior, and the like. In some cases, a score may also be calculated for a vehicle based on various contextual data characterizing, for example, the vehicle's driving history and record (e.g., accidents, repairs, etc.), maintenance records, and the like.

The score for a driver may be correlated with the driver's performance when the driver is transporting riders of the shared mobility service and/or other passengers, instead of a driver's performance during personal driving. Accordingly, aspects of the disclosure relate to automatically determining when passengers are present in a shared mobility service vehicle. Techniques for detecting passengers may include recording sounds within the vehicle and identifying the presence of passengers by detecting voices. To prevent false positives, systems described herein may recognize a driver's voice. Systems described herein may also detect when a media program (e.g., a radio station or podcast) is playing to avoid incorrectly detecting passengers based on voices from the media program.

Further aspects of the disclosure relate to matching passengers with other passengers and/or a driver of a shared mobility service based on one or more shared or conflicting attributes of the passengers and/or the driver. Personal attributes may be determined based on a variety of data including driving data, demographics data, credit history, purchase histories, recorded audio or video signals of passengers and/or a driver interacting during operation of the shared mobility service, and other information. Such matching may provide a more pleasant ride for passengers of a shared mobility service by matching them with other drivers and/or passengers with whom they share some common attribute, or with whom they do not have conflicting attributes that may make the ride unpleasant.

Further aspects of the disclosure relate to providing preferences to drivers and/or vehicles with higher scores and/or closer profile matches over other drivers and/or vehicles. For example, systems described herein may provide, to higher-ranked drivers (e.g., drivers with closer profile matches to a potential rider, and/or drivers carrying riders with closer profile matches to a potential rider), a first preference for accepting a ride request from a passenger, an additional cut of a fare, and/or opportunities to pick up highly-rated passengers, among other preferences.

Figure 1B:
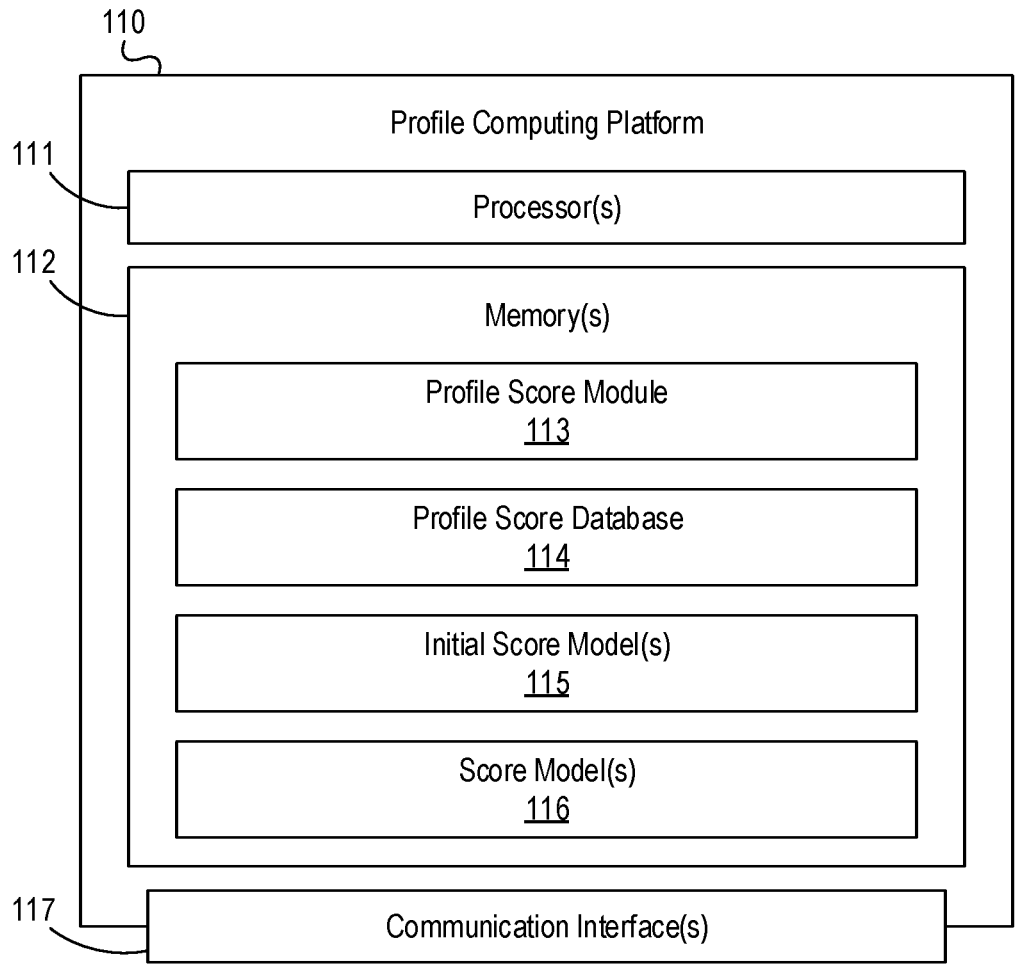
Figure 1C:
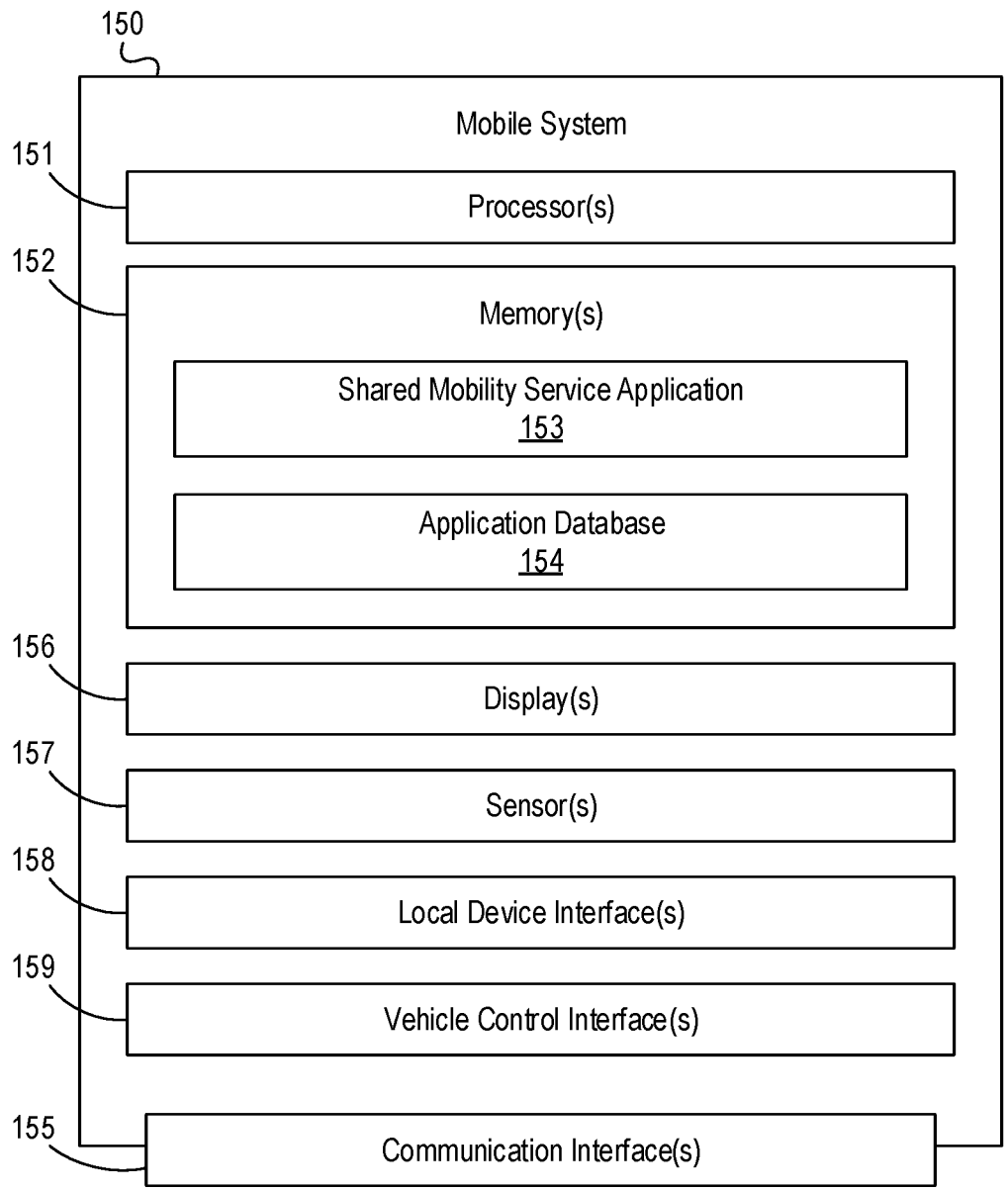

FIGS. 1A, 1B, and 1C depict an illustrative operating environment for controlling operation of a shared mobility service based on profiles in accordance with one or more example embodiments. Referring to FIG. 1A, operating environment 100 may include a profile computing platform 110, a shared mobility service management system 120, driver/vehicle history source(s) 130, dynamic information source(s) 140, a first mobile system 150, a second mobile system 160, and a third mobile system 170. In one or more arrangements, profile computing platform 110, shared mobility service management system 120, driver/vehicle history source(s) 130, dynamic information source(s) 140, the first mobile system 150, the second mobile system 160, and the third mobile system 170 may be connected by a public network 180 (e.g., the Internet) and/or a private network 190 (e.g., a network associated with a shared mobility service company), each of which may include one or more wired networks and/or one or more wireless networks. In addition, each of profile computing platform 110, a shared mobility service management system 120, driver/vehicle history source(s) 130, dynamic information source (s) 140, the first mobile system 150, the second mobile system 160, and the third mobile system 170 may be special purpose computing devices configured to perform specific functions, as illustrated in greater detail below, and may include specific computing components such as processors, memories, communication interfaces, and/or the like.

For example, profile computing platform 110 may be configured to control or manage aspects of a shared mobility service, including receiving and analyzing information about drivers, calculating scores, providing rankings of drivers and other shared mobility service management and control functions. Shared mobility service management system 120 may be configured to manage aspects of a shared mobility service, including receiving trip requests, matching drivers with riders, and other shared mobility service management or control functions. In some embodiments, profile computing platform 110 and shared mobility service management system 120 may be parts of a single shared mobility service management computing platform. Accordingly, functions and/or capabilities ascribed herein to either of profile computing platform 110 and shared mobility service management system 120 may be performed by a single system and/or computing platform. In some embodiments, profile computing platform 110 may be associated with a first organization (e.g., an insurance company), and shared mobility service management system may be associated with a second organization (e.g., a shared mobility service company).

Driver/vehicle history source(s) 130 may be configured to collect and provide information about drivers, riders, and/or vehicles, including demographics data, accident history, vehicle maintenance records, driving habits information, preference information (e.g., online purchase information), and the like. Dynamic information source(s) 140 may be configured to collect and provide information about driving conditions such as weather conditions, road conditions, traffic conditions, and the like.

Mobile systems 150, 160, 170 may be configured to monitor and/or send vehicle guidance data (which may include, e.g., speed data, position data, destination data, and operating status of autonomous mode) associated with corresponding vehicles to profile computing platform 110 and/ or one or more other computing devices included in operating environment 100. Mobile systems 150, 160, 170 may be further configured to run one or more applications, including shared mobility service application 153, for communicating and interfacing with profile computing platform 110, shared mobility service management system 120, and/or other devices connected via public network 180 and/or private network 190. The vehicles associated with mobile systems 150, 160, 170 may be autonomous vehicles.

Referring to FIG. 1B, profile computing platform 110 may include a processor 111, memory 112, and a communication interface 117. Processor 111 may control operations of profile computing platform 110, and memory 112 may store instructions that, when executed by processor 111, cause profile computing platform 110 to perform one or more functions. Communication interface 117 may include one or more wired and/or wireless network interfaces, and communication interface 117 may connect profile computing platform 110 to one or more networks (e.g., public network 180 and/or private network 190) and/or enable profile computing platform 110 to exchange information and/or otherwise communicate with one or more devices connected to such networks. Memory 112 may store and/or otherwise provide a profile score module 113 and a profile score database 114. Profile score module 113 may store instructions that, when executed by processor 111, cause profile computing platform 110 to compute scores, rank drivers, and/or perform one or more other shared mobility service management functions. Profile score database 114 may store information that may be used by profile computing platform 110 in calculating scores and/or in performing one or more other shared mobility service management functions. Initial score model(s) 115 and score model(s) 116 may be used by profile computing platform 110 to calculate the one or more scores.

Referring to FIG. 1C, mobile system 150 may include a processor 151, memory 152, and a communication interface 155. In some embodiments, mobile system 150 may be integrated with a vehicle; in some embodiments, mobile system 150 may be a separate device associated with a vehicle (e.g., a driver's mobile phone or other mobile device), that may optionally communicate with and control functions of the vehicle. Processor 151 may control operations of mobile system 150, and memory 152 may store instructions that, when executed by processor 151, cause mobile system 150 to perform one or more functions. Communication interface 155 may include one or more wired and/or wireless network interfaces, and communication interface 155 may connect mobile system 150 to one or more networks (e.g., public network 180 and/or private network 190) and/or enable mobile system 150 to exchange information and/or otherwise communicate with one or more devices connected to such networks. Memory 152 may store and/or otherwise provide a shared mobility service application 153 and an application database 154. Shared mobility service application 153 may store instructions that, when executed by processor 151, cause mobile system 150 to interface and communicate with profile computing platform 110 and/or shared mobility service management system 120 in order to book trips, exchange shared mobility service data, and perform other shared mobility service management functions. Application database 154 may store information that may be used by mobile system 150 for executing and performing the functions of the shared mobility service application 153.

Mobile system 150 also may include a display 156, sensors 157, a local device interface 158, and a vehicle control interface 159. Display 156 may display one or more user interfaces to a driver and/or passengers of a vehicle containing mobile system 150. Display 156 may accept input (e.g., via a touchscreen interface) or be associated with one or more user interfaces that accept input related to the displayed user interfaces. Sensors 157 may sense conditions associated with a vehicle in which mobile system 150 may be installed and may output analog signal data and/or digital signal data to mobile system 150. Such data collected via sensors 157 may include engine data, performance data, navigation data, position data, speed data, acceleration data, braking data, and/or other vehicle data. Local device interface 158 may include one or more wired and/or wireless communication interfaces and may, for example, enable mobile system 150 to exchange information with and/or otherwise communicate with one or more devices that may be located inside of, close to, and/or within a predetermined distance of a vehicle in which mobile system 150 may be installed. For example, local device interface 158 may enable mobile system 150 to communicate with one or more smart phones, tablet computers, and/or other mobile computing devices that may be used by and/or otherwise associated with a driver of and/or one or more passengers of a vehicle in which mobile system 150 may be installed. Vehicle control interface 159 may include one or more wired and/or wireless communication interfaces and may, for example, enable mobile system 150 to exchange information with and/or otherwise communicate with one or more devices and/or components of an autonomous vehicle in which mobile system 150 may be installed so as to direct and/or control the autonomous vehicle in which mobile system 150 may be installed. For example, vehicle control interface 159 may enable mobile system 150 to accelerate and/or decelerate the autonomous vehicle in which mobile system 150 may be installed, steer the autonomous vehicle in which mobile system 150 may be installed, direct the autonomous vehicle in which mobile system 150 may be installed to one or more specific locations, drive the autonomous vehicle in which mobile system 150 may be installed, and/or otherwise control operations of the autonomous vehicle in which mobile system 150 may be installed.

Figure 2C:
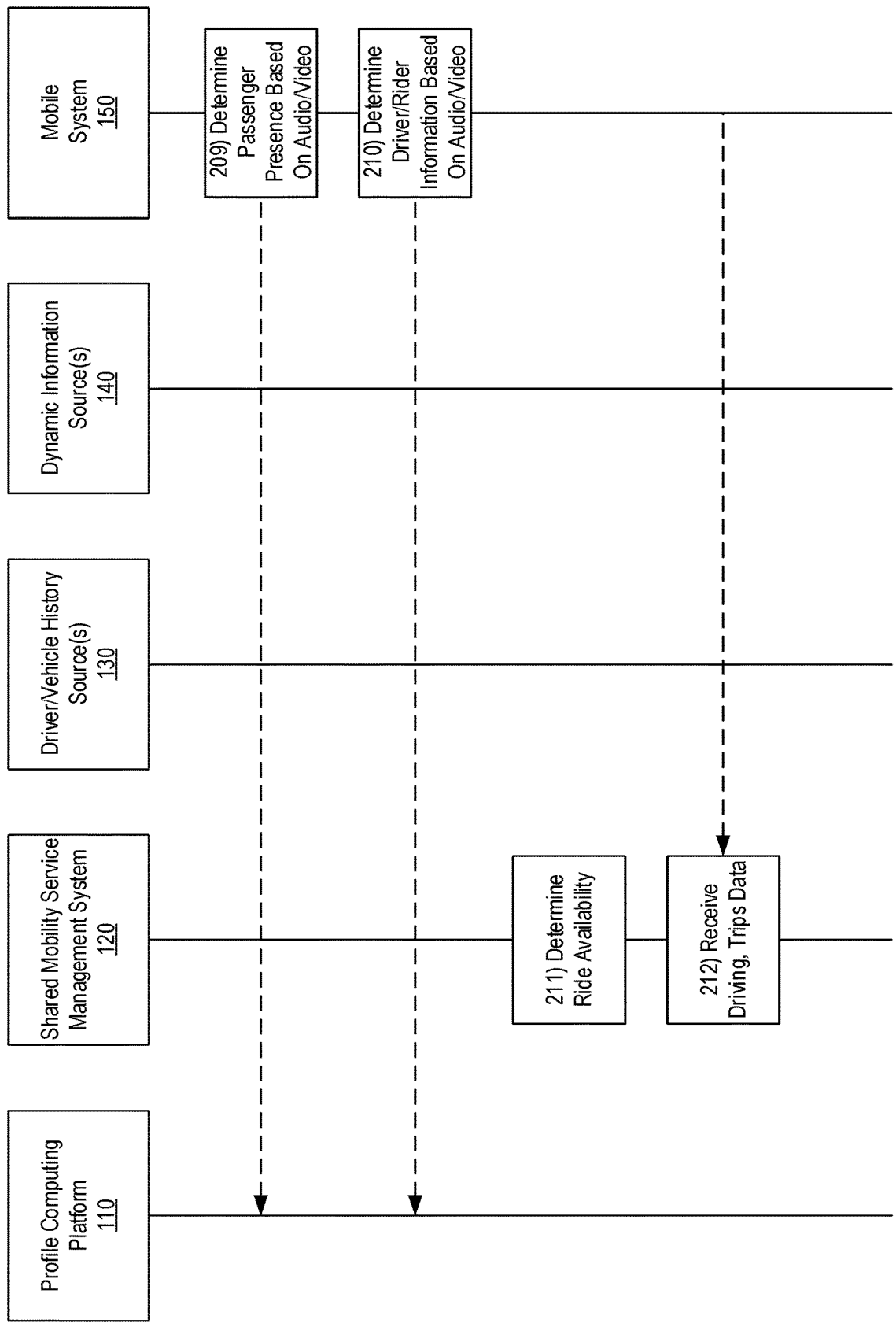

FIGS. 2A, 2B, 2C, 2D, and 2E depict an illustrative event sequence for controlling operation of a shared mobility service based on driver profiles. Referring to FIG. 2A, at step 201, shared mobility service management system 120 may receive information about a driver or rider, such as a driver or rider that joins a shared mobility service. For example, a new driver may provide identification information to a shared mobility service that operates the shared mobility service management system 120 during a job application process, or a new rider may provide identification information to the shared mobility service during a profile creation process. In some embodiments, a new member of a shared mobility service may join as both a driver and rider of the shared mobility service (as in, e.g., a carpool service). An operator (e.g., an employee of the shared mobility service) may then enter the information about the new driver or rider (e.g., through a user interface rendered by the shared mobility service management system 120). In some instances, shared mobility service management system 120 may be configured to automatically receive new driver information from another system that provides an automated employment application workflow. Additionally or alternatively, shared mobility service management system 120 may provide information for one or more existing drivers (e.g., employees and/or contractors) or riders (e.g., existing customers or members of a shared mobility service). Information about the rider or driver may include one or more of name, address, social security number, driver's license number, insurance information, work experience, and the like.

In some embodiments, information about a driver may further include information a vehicle owned or used by the driver for the shared mobility service. Accordingly, the information may include, for example, a vehicle identification number (VIN), a make, model, and/or year of the vehicle, and the like.

At step 202, profile computing platform 110 receives an identification for the rider or driver of step 201. The identification may include some or all of the information received at step 201. The profile computing platform 110 may use the identification to uniquely identify the driver or rider in order to retrieve history information for the driver or rider. For example, a driver's license number may uniquely identify the driver or rider for the purpose of retrieving one or driver records from local government agencies (e.g., a DMV). Accordingly, at step 203, profile computing platform 110 may send identification information to one or more driver/vehicle history source(s) 130 in order to retrieve history information. For example, profile computing platform 110 may send information including a driver's license number to a server associated with a local government as part of a query for a motor vehicle report (MVR) comprising a driving history. As another example, profile computing platform 110 may send a name and a social security number to a server associated with a background check company as part of a query for a background check of the driver. Profile computing platform 110 may also send identification information to one or more servers that provide offline data records, such as purchase history, and/or online behavior records, such as websites visited, videos watched, and other such information. Profile computing platform 110 may further send vehicle identification information to one or more servers that provide additional information about a vehicle associated with a driver, such as maintenance records, registration records, and the like. The driver/vehicle history source(s) 130 may retrieve the requested information and return the information to profile computing platform 110, as illustrated at step 203.

At step 204, profile computing platform 110 may calculate an initial profile based on the information obtained at step 202 and/or step 203. The initial profile may include one or more attributes for the driver, rider, and/or vehicle, as well as one or more initial scores. The profile computing platform 110 may use one or more initial score models 115 trained on training data to calculate one or more initial scores. The scores may include ratings of various aspects of the driver, rider, or vehicle. For example, scores for a driver may include a safety score, a revenue score, one or more scores that predict personality factors of the driver (e.g., interests of the driver, such as what kinds of movies the driver likes). The profile may further include other scores that comprehensively profile the driver, rider, or vehicle.

The one or more initial score models 115 may be trained using machine-learning techniques, statistical techniques, and/or other such techniques for correlating one or more features with historical outcome data. The profile computing platform 110 may train the one or more models prior to executing the method of FIGS. 2A, 2B, 2C, 2D, and 2E. For example, to calculate a safety score, the historical outcome data may include indications of safety for a number of drivers or riders. To calculate a revenue score, the historical outcome data may include indications of revenue for drivers. To calculate a personality score, the data may further include indications of personality, such as history data indicating a favorite shows and movies, mobile history data, internet browsing and purchase data, videos watched on a streaming website, and the like. Accordingly, the one or initial score models 115 may calculate an initial score that estimates, for example, safety, revenue, and/or personality scores for a rider and/or driver of the shared mobility service. In some embodiments, one initial score model 115 may be trained to calculate an initial safety score, another initial score model 115 may be trained to calculate an initial revenue score, and additional initial score models 115 may be trained to calculate various personality scores.

The profile computing platform 110 may train an initial score model 115 for estimating safety using training data that correlates history information with indicators of safety. For example, the training data set may include history information obtained from an MVR, such as endorsements, license class, license statuses, license restrictions, and the like. Additionally or alternatively, history information may include background check and other information such as criminal records, commercial records, financial records, credit scores, purchase histories, web browsing histories, videos watched, and the like. The indicators of driver safety may include accident data, tickets, license suspensions and/or cancellations, the cost of insuring a driver, and the like. In some embodiments, such a model may be trained to output a continuous value indicating an estimated shared mobility service insurance premium (e.g., in dollars) over a given period (e.g., monthly). Additionally or alternatively, a model may be trained to output a discrete value indicating, for example, an estimated range of an insurance premium (e.g., in dollars) over a given period (e.g., monthly). For example, the model may classify a driver or rider into one of 5 discrete insurance premium ranges.

The profile computing platform 110 may also train an initial score model 115 for estimating a driver's revenue using training data that correlates driver history information with indicators of shared mobility service revenue. For example, the training data set may include driver history information obtained from an MVR, such as endorsements, license class, license statuses, license restrictions, and the like. Additionally or alternatively, driver history information may include background check information such as criminal records, commercial records, financial records, credit scores, and the like. The indicators of initial score model 115 revenue may include a numbers of trips taken (e.g., in a given period), revenue earned, and the like. In some embodiments, such an initial score model 115 may be trained to output a continuous value indicating an estimated revenue (e.g., in dollars) over a given period (e.g., monthly). Additionally or alternatively, a model may be trained to output a discrete value indicating, for example, an estimated range of revenues (e.g., in dollars) over a given period (e.g., monthly). For example, the model may classify a driver into one of 5 discrete revenue ranges.

The profile computing platform 110 may also train an initial score model 115 for estimating a particular personality score (e.g., a type of movie the rider or driver likes, whether the rider or driver is introverted or extroverted, or the like) using training data that correlates behavior data with indicators of particular personality traits. For example, the training data set may include behavior data such as internet browsing and purchase data, mobile history data, videos watched on a streaming website, and other such data. The indicators of personality traits may include surveys of preferences, psychological assessments, and the like. In some embodiments, such an initial score model 115 may be trained to output a continuous value indicating an estimated strength of a personality trait for a driver or rider.

Accordingly, at step 204, profile computing platform 110 may use the identification information and/or history information obtained at step 202 and/or step 203 as inputs to the one or more initial score models 115. In some embodiments, profile computing platform 110 may extract and/or calculate features from the identification information and/or history information before using the features as inputs to the one or more initial score models 115. Profile computing platform 110 may then determine, using the one or more initial score models 115, one or more initial scores. In some embodiments, the one or more initial score models 115 may also output a confidence level. The confidence level may reflect a relatively lower or higher confidence based, for example, on an amount of information that was input to the model, on a similarity between the information and training data used to train the one or more models, and the like.

In some embodiments, profile computing platform 110 may calculate multiple scores using multiple initial score models 115. Then, profile computing platform 110 may optionally combine one or more of the scores to form a composite initial score. For example, profile computing platform 110 may average the safety and revenue scores to form a composite initial score of profitability. In some instances, profile computing platform 110 may combine a safety score scaled to estimate a dollar cost of insuring a new driver (e.g., the sub-score may be a negative number estimating a monthly insurance premium) with a revenue score scaled to estimate the driver's revenue in dollars (e.g., the sub-score may be a positive number estimating monthly revenue). The profile computing platform 110 may combine the scores using addition or subtraction to yield a composite initial score that predicts a new driver's revenues less insurance costs.

In some embodiments, profile computing platform 110 may further train and use one or more models to generate one or more vehicle scores based on information about a vehicle. For example, a model may be trained to calculate a vehicle score indicating, for example, a vehicle safety.

Profile computing platform 110 may further determine one or more attributes for inclusion in the initial profile, based on information received at steps 202 and/or 203. Profile computing platform 110 may use one or more rules to generate attributes. For example, if an MVR for a driver or rider indicates more than a threshold number (e.g., two) tickets for speeding within a certain time period (e.g., the last three years), the driver or rider may be tagged with an attribute of "speeder." As another example, if maintenance records indicate the driver or rider performed all the scheduled oil changes for a vehicle associated with the driver or rider, the driver or rider may be tagged with an attribute of "conscientious." As a third example, drivers or riders may be tagged with one or more demographic profile attributes based on one or more pieces of demographic information, such that drivers may be tagged with attributes for "young male," "teen college student," "middle age professional," or other such demographic categories.

Profile computing platform 110 may similarly use one or more rules and/or lists of vehicles to determine attributes for vehicles to include in an initial vehicle profile. For example, vehicles may be tagged with attributes such as "new" based on a model year of the vehicle, "sporty" based on model of the vehicle, "luxury" based on a make, model, trim, and/or color of a vehicle, and the like.

Profile computing platform 110 thus generates an initial profile for a driver, rider, and/or vehicle based on the information collected at steps 202 and/or 203. The initial profile may include one or more attributes and one or more initial scores.

Referring to FIG. 2B, at step 205, responsive to generating an initial profile for a new driver, profile computing platform 110 may retrieve scores for other drivers in a fleet of drivers (e.g., a group of drivers associated with a particular shared mobility service and/or a particular division of the shared mobility service, such as a city or other location) and rank the new driver against the other drivers in the fleet. A shared mobility service associated with shared mobility service management system 120 may include a plurality of other drivers for which profile computing platform 110 previously calculated scores. The profile computing platform 110 may then rank the driver against the other drivers based on the scores associated with each driver (e.g., based on a composite score that estimates a driver profitability).

At step 206, profile computing platform 110 may estimate one or more adjustments to a fleet profile based on the initial profile. For example, profile computing platform 110 may estimate that adding the new driver to the fleet will cause an average revenue to rise, fall, or stay the same. As another example, profile computing platform 110 may estimate that adding the new driver to the fleet will cause an average insurance premium and/or an overall insurance premium to rise, fall, or stay the same. Additionally, profile computing platform 110 may estimate a magnitude of each change (e.g., as a percentage, dollar figure, and/or the like). To determine the change, profile computing platform 110 may compare a fleet score average that includes the scores for the new driver with a fleet score average that does not include the scores for the new driver. Accordingly, based on whether the driver's scores cause the fleet average to rise or fall, the shared mobility service associated with shared mobility service management system 120 may decide whether to hire the new driver (e.g., as a new contractor or employee).

The profile computing platform 110 may further provide similarity information based on certain attributes and/or scores associated with a new driver and/or a new rider. For example, if a large number of riders of the shared mobility service have a strong interest in movies, and a potential new driver also has a strong interest in movies, then hiring the potential new driver may help with customer engagement or retention. Accordingly, if the initial profile for a new driver indicates that the driver has one or more scores or attributes (e.g., a willingness to take long-haul rides, an interest in movies, or certain other personality factors) that are compatible with a large number of riders associated with the shared mobility service, the profile computing platform 110 may flag the common attributes or scores for review by the shared mobility service. Similarly, if the driver's initial profile has one or more scores or attributes that conflict with scores or attributes of riders (or other drivers) of the shared mobility service, the profile computing platform may flag the conflicting attributes or scores for review.

At step 207, profile computing platform 110 may generate and transmit a user interface that presents summary information about the new driver, optionally including the estimated adjustments and/or flagged attributes or scores determined in step 206. The profile computing platform 110 may cause the user interface to be displayed on shared mobility service management system 120. For example, profile computing platform 110 may render the user interface as a web page that may be accessed by a browser running on shared mobility service management system 120, send a transmission containing the information (e.g., an email), or otherwise cause display of the driver summary information.

Turning to FIG. 3, an example user interface 300 displays information about summary information for a new driver. The summary information may include driver information, such as a driver name, as illustrated. Additionally or alternatively, the information may include an initial score, information about the initial score, and/or one or more attributes of the new driver. In some embodiments, a value (e.g., a numerical value) of the initial score may be displayed in the user interface 300. Additionally or alternatively, as illustrated, the user interface may display a comparison of the initial score with an average score (e.g., a fleet average score). In some instances, a confidence level associated with the initial score may be displayed. In the illustrated embodiment, user interface 300 may further display an estimated adjustment to a fleet average of the score. Additionally or alternatively, the user interface 300 may display an estimated adjustment to a fleet insurance premium (e.g., an average insurance premium and/or a driver-specific insurance premium). The user interface 300 may also display one or more attributes or scores that the driver shares in common with (or that conflict with) riders of the shared mobility service, and optionally a percentage of riders associated with the common or conflicting attribute.

A shared mobility service company may wish to make an employment and/or engagement decision (e.g., hire a driver as an employee or contractor, accept a driver as a new carpooler, accept a vehicle for a car-sharing service, or the like) based on the information presented in the user interface 300. Accordingly, in some embodiments, the user interface may further include a recommendation of whether to hire the driver. The profile computing platform 110 may determine the recommendation based on the driver information and estimated fleet profile adjustments. For example, profile computing platform 110 may compare the initial score and/or estimated fleet profile adjustments to one or more thresholds. If some or all of the comparisons satisfy the threshold(s), profile computing platform 110 may indicate a hire recommendation.

With further reference to FIG. 2B, at step 208, the mobile system 150 may collect and store driving and/or trips data associated with a driver and one or more riders during operation of the shared mobility service (e.g., after a new driver has been hired and starts working for the shared mobility service). Driving data may comprise data collected from sensors 157 associated with a vehicle and/or the mobile system 150, such as engine data, performance data, navigation data, position data, speed data, acceleration data, braking data, and the like. Trips data may include data about one or more shared mobility service trips, such as pickup and drop-off locations and/or times, identifications of one or more passengers, a recommended route between the pickup and drop-off locations, an actual route taken, and the like. The driving data and/or the trips data may be associated with time stamps indicating a time at which the data was captured. The driving data and/or the trips data may be collected by shared mobility service application 153 executing on the mobile system 150, which may store the driving data and/or trips data in the application database 154.

In some embodiments, the mobile system 150 may process the driving data upon or after collection and/or storage. For example, the mobile system 150 may use statistical and/or mathematical techniques to determine additional driving data based on the raw sensor data collected from sensors 157. As a specific example, mobile system 150 may analyze and/or process raw braking data and/or raw acceleration data to detect incidents in which a vehicle experienced sharp braking. Mobile system 150 may log an event for each sharp braking incident. Each such event may include an indication of the severity of the braking, a speed when braking began, a time of the event, an amount of time that elapsed from the start of braking to the end of braking, and the like. As another example, mobile system 150 may process and/or analyze raw speed and/or raw position data to determine an average speed of the vehicle (e.g., during a certain time period, during a certain trip, and the like). As another example, the mobile system 150 may process position data to determine one or more point of interest visited by a driver (e.g., at various times, including when the driver is not working). In some embodiments, the profile computing system 110 and/or the shared mobility service management system 120 may perform such processing and/or analysis instead of or in conjunction with the mobile system 150.

Referring to FIG. 2C, at step 209, the mobile system may determine one or more time periods associated with the driving and trips data during which one or more riders were present in a vehicle associated with mobile system 150. In some embodiments, the trips data received at step 209 may indicate when passengers were present. For example, if the trips data includes a pickup time and a drop-off time, profile computing platform 110 may determine that a passenger was present during the time period in between the pickup and drop-off times.

In some embodiments, the mobile system 150 and/or profile computing platform 110 may determine or verify passenger presence information based on voice, video, and/or wireless signals captured by the shared mobility service application 153 of mobile system 150. The shared mobility service application 153 may record sounds via a microphone of the mobile system 150, record video via a video camera of the mobile system 150, and/or detect wireless signals received via an antenna of the mobile system 150. Then, the mobile system 150 and/or profile computing platform 110 may analyze the recorded sounds, videos, and/or wireless signals to determine time periods when passengers were present.

Accordingly, the shared mobility service application 153 may cause the mobile system 150 to periodically or continuously record audio signals of sounds in a passenger cabin of an associated vehicle. In some embodiments, the shared mobility service application 153 may locally analyze the audio signals to determine the presence of one or more voices. Accordingly, the shared mobility service application 153 may implement one or more voice recognition and/or identification techniques to recognize and classify acoustic features of speech. For example, the shared mobility service application 153 may generate individual voice prints from recorded speech. A voice print may include statistical measures of one or more acoustic qualities of recorded speech (e.g., in frequency and/or time domains).

The shared mobility service application 153 may be trained to distinguish a driver's voice from a voice of other passengers. Accordingly, the shared mobility service application 153, during a configuration process, may record the driver speaking, analyze the recording to generate a voice print for the driver, and store the driver's voice print. Then, during the analysis of step 209, a voice print generated from recorded speech may be compared to the stored driver's voice print. If the voice prints differ (e.g., by more than one or more threshold amounts), the shared mobility service application 153 may determine that a passenger is present.

The shared mobility service application 153 may be configured to avoid recording and/or analyzing audio signals containing media programs (e.g., radio programs, podcasts, music, and the like), in order to avoid incorrectly detecting a passenger based on speech within the media program. In some embodiments, mobile system 150 may control or access a digital output stream associated with such media programs (e.g., when mobile system 150 is integrated with a vehicle and/or a vehicle entertainment system). The mobile system 150 may capture the digital stream before its output by speakers in the passenger cabin. The shared mobility service application 153 may then compare the digital stream to a recorded audio signals in order to determine a difference signal. The media program may be "cancelled out" of the difference signal by virtue of appearing in both the digital stream and the recorded audio. However, passenger voices may remain in the difference signal because they are only included in the recorded audio. Therefore, the shared mobility service application 153 may analyze the difference signal to detect passenger presence.

Additionally or alternatively, the shared mobility service application 153 may be configured to recognize when recorded audio signals contain a media program, and avoid detecting passenger presence based on such recorded audio signals. For example, shared mobility service application 153 may detect that a recorded audio signal contains a media program based on acoustic features of the recorded audio signal. In some embodiments, speech of a media program may be more uniform in volume than a spoken conversation between passengers at different locations in a cabin of the vehicle. Accordingly, shared mobility service application 153 may detect a media program in a recorded audio signal based on measuring a volume property of the recorded audio signal over time. Additionally or alternatively, speech of a media program may include musical interludes, commercial advertisements, and the like that may be detected by the presence, in the recorded audio signal, of pauses, music, volume changes, and the like. Accordingly, shared mobility service application 153 may be configured to detect a media program based on the one or more acoustic features, including frequency and/or time-domain features, of the recorded audio signal. If shared mobility service application 153 detects a media program in the recorded audio signal, shared mobility service application 153 may avoid estimating passenger presence based on the recorded audio signal.

The shared mobility service application 153 may additionally or alternatively be further configured to determine time periods when passengers were present based on captured videos. The shared mobility service application 153 may cause the mobile system 150 to periodically or continuously record videos of a passenger cabin of an associated vehicle. In some embodiments, the shared mobility service application 153 may locally analyze the video signals to determine the presence of one or more passengers in the vehicle. Accordingly, the shared mobility service application 153 may implement one or more image recognition and/or identification techniques to recognize passengers appearing in the video. The shared mobility service application 153 may be trained to distinguish a driver appearing in the video from other passengers appearing in the vehicle.

The shared mobility service application 153 may be further configured to determine time periods when passengers were present based on detecting passengers' wireless mobile devices. In some embodiments, shared mobility service application 153 may cause the mobile system 150 to passively monitor wireless signals, such as cellular signals, Wi-Fi signals, BLUETOOTH signals, and the like, to detect the presence of one or more mobile devices in the vehicle. Additionally or alternatively, shared mobility service application 153 may cause the mobile system 150 to attempt to communicate with one or more mobile devices in the vehicle. For example, mobile system 150 may enable a WI-FI base station function and/or a BLUETOOTH pairing function and detect the presence of one or more passengers based on the passengers' mobile devices communicating with the mobile system via the enabled function. In some embodiments, shared mobility service application 153 may only determine that a passenger is present after repeatedly detecting wireless signals associated with a passenger (e.g., more than a threshold number of times and/or over a threshold period of time), in order to avoid spurious passenger detections based on wireless signals from other vehicles, pedestrians, etc.

In some embodiments, the profile computing platform 110 may perform some or all of the analysis of the recorded audio signals, video signals, and/or wireless signals. For example, the shared mobility service application 153 may record audio signals, video signals, and/or wireless signals received locally and upload the recorded audio signals and/or wireless signals via an interface of profile computing platform 110. The profile computing platform 110 may then analyze the recorded audio signals and/or wireless signals to determine a number of passengers and indicate the determined number to the shared mobility service application 153.

FIG. 4 illustrates an example user interface 400 that shared mobility service application 153 may cause mobile system to present (e.g., via display 156). The user interface 400 may include one or more indications of an estimated number of passengers detected by the shared mobility service application 153. For example, as illustrated the user interface may indicate a number of estimated passengers detected from recorded audio signals. Additionally or alternatively, the user interface may indicate a number of estimated passengers detected from received wireless signals. A user of the mobile system (e.g., the driver) may indicate whether an estimated number of passengers is correct or not. In some embodiments, the user interface 400 may only be displayed if the number of passengers detected from recorded audio signals differs from the number of passengers detected from wireless signals. Additionally or alternatively, the driver may manually enter a number of passengers via an input device of mobile system 150 (e.g., via a touchscreen display 156).

The mobile system 150 transmits the determined passenger data (as well as audio signals, video signals, and/or wireless signals for analysis in some cases) to the profile computing platform 110. Such data may be transmitted periodically, in real-time, or at any frequency. The passenger data may include an estimated number of passengers (e.g., as determined based on wireless signals, video signals, and/or recorded audio signals), a number of passengers indicated by the driver, an indication of whether the driver verified an estimated number of passengers, and the like.

Returning to FIG. 2C, at step 210, the mobile system 150 and/or the profile computing platform 110 may determine further driver and/or rider information based on the captured audio signals, video signals, and/or wireless signals. Such signals may be analyzed to determine one or more attributes of the driver and/or rider. For example, based on the audio signals, the mobile system 150 and/or profile computing platform 110 may determine whether the driver and/or rider(s) talked frequently or did not talk very much. The mobile system 150 and/or profile computing platform 110 may further perform sentiment analysis on the recorded speech to determine one or more moods of the driver and/or rider(s). The mobile system 150 and/or profile computing platform 110 may further analyze video information to recognize one or more gestures made by the driver and/or rider(s). The mobile system 150 and/or profile computing platform 110 may further analyze wireless signals to determine whether the driver and/or rider(s) were actively using a cellular data connection or not. The mobile system 150 further transmits the additional driver and/or rider information to the profile computing platform 110. Such data may be transmitted periodically, in real-time, or at any frequency.

At step 211, the shared mobility service management system 120 may optionally determine ride availability based on the received passenger data. The shared mobility service management system 120 may retrieve stored information indicating a number of available seats in a vehicle associated with the driver. The shared mobility service management system 120 may then compare the number of available seats to a number of passengers to determine whether the driver associated with the mobile system has availability for picking up more riders.

Figure 2D:
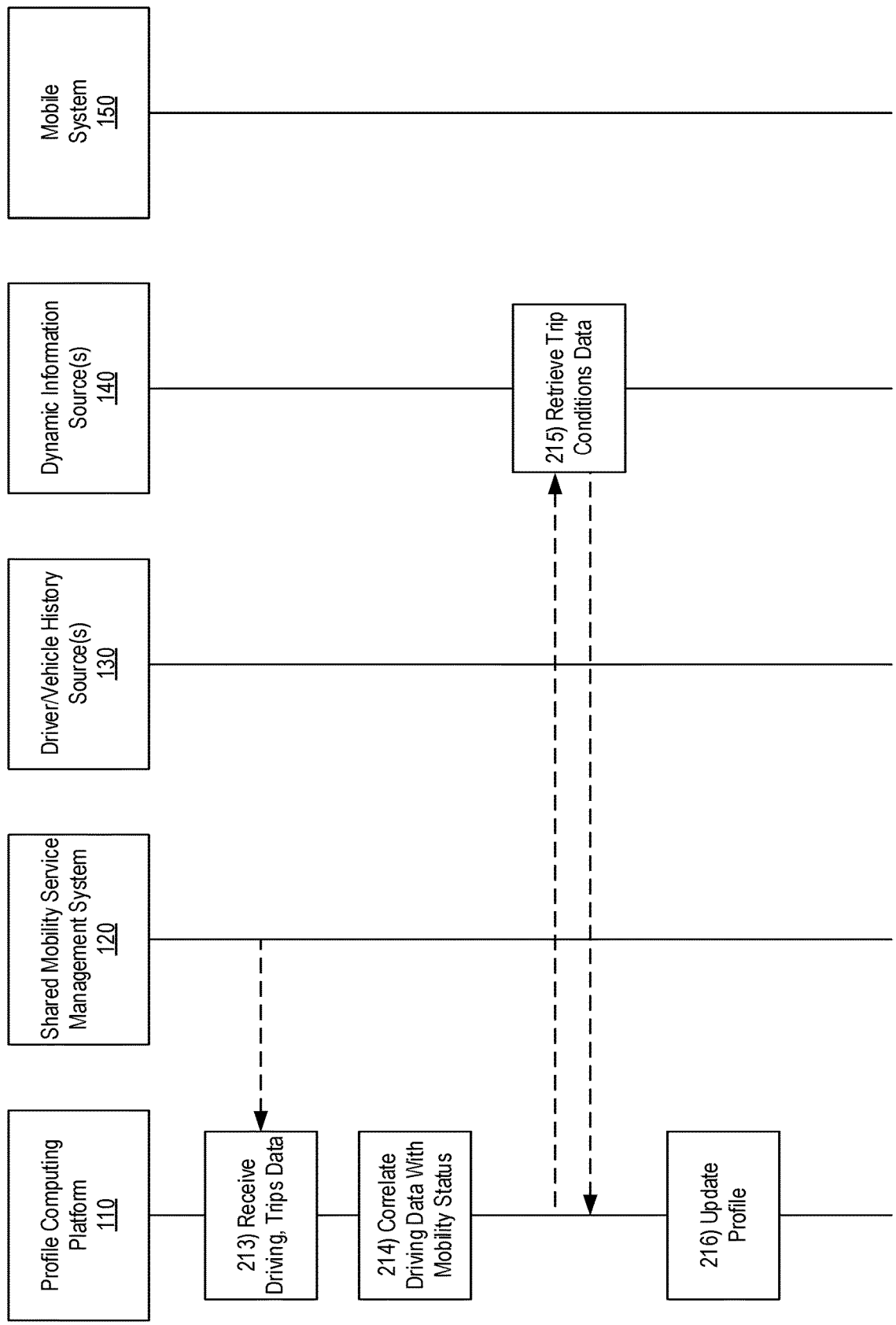

At step 212, the mobile system 150 may also transmit driving and trips data collected at step 208 to shared mobility service management system 120. The mobile system 150 may transmit the driving and trips data periodically and/or in real-time. Referring to FIG. 2D, at step 213, shared mobility service management system 120 may transmit some or all of the driving data and trips data to profile computing platform 110, which receives the transmitted data. In some embodiments, a shared mobility service company associated with shared mobility service management system 120 may only share portions of the gathered driving and trips data associated with a driver with an insurance company associated with profile computing platform 110.

At step 214, profile computing platform 110 may correlate the driving data with the one or more time periods associated with a mobility status. The mobility status may include a "personal" status indicating that the mobile system 150 was not participating in the shared mobility service (e.g., the driver was on personal time), a "no passengers" status indicating that the mobile system 150 was participating in the shared mobility service without passengers (e.g., while looking for a ride), a "heading to ride" status indicating the mobile system 150 was heading towards a booked ride for the shared mobility service, and/or a "passengers" status indicating that the mobile system 150 was participating in the shared mobility service with riders (e.g., during a booked trip). The profile computing platform 110 may determine the time periods and corresponding mobility status based on the passenger presence data (e.g., as determined at step 209 and/or received at step 210) and/or the trips data (e.g., as received at step 213). For example, profile computing platform 110 may compare timestamps associated with driving data to timestamps and/or time periods associated with passenger presence data and/or trips data indicating the mobile system 150 was engaged in shared mobility service trips. Accordingly, driving data may be categorized with a mobility status indicating whether the mobile system 150 was engaged in the shared mobility service or not, and whether any riders were riding in the associated vehicle.

At step 215, profile computing platform 110 may request and receive trip conditions data from one or more dynamic information source(s) 140. Such sources may include sources of weather information, traffic information, road conditions, event information, and the like. In some embodiments, profile computing platform 110 may only retrieve trips condition data for time periods corresponding to a mobility status of "no passengers", "heading to ride," or "passengers" (e.g., time periods during which the driver was working for the shared mobility service). The profile computing platform 110 may transmit one or more queries indicating the type of information desired, and a time and/or location corresponding to the driver. For example, the profile computing platform 110 may transmit a query for each 15-minute interval during which the mobile system was in a mobility status of "passengers," "heading to ride," or "no passengers." The query may contain a time corresponding to the 15-minute interval (e.g., a start time, an end time, a time in the middle, etc.) and/or one or more locations corresponding to the 15-minute interval (e.g., GPS coordinates, neighborhoods, roads, road segments, and the like).

Based on the received query, one of the dynamic information source(s) may retrieve the requested information and return it to profile computing platform 110. Accordingly, one or more dynamic information source(s) 140 may retrieve weather information, traffic information, road conditions information, event information, and/or other trip conditions data based on a time and one or more locations associated with each query. The profile computing platform 110 may receive such information from the one or more dynamic information source(s) 140.

At step 216, profile computing platform 110 may update a profile for a driver and/or a rider based on the trip conditions data, the mobility status data, the driving data, the trips data, the passenger presence data, the driver information data, the history data, and/or the audio, video, and/or wireless signals captured by the shared mobility service application 153. The profile computing platform 110 may use one or more score models 116 trained on the trip conditions data, the mobility status data, the driving data, the trips data, the passenger presence data, the driver information data, the history data, and/or the audio, video, and/or wireless signals captured by the shared mobility service application 153. The one or more score models 116 may be trained using machine-learning techniques, statistical techniques, and/or other such techniques for correlating one or more features with historical outcome data. The profile computing platform 110 may train the one or more score models 116 prior to executing the method of FIGS. 2A, 2B, 2C, 2D, and 2E. The historical outcome data may include indications of risk and/or safety. Additionally or alternatively, the historical outcome data may include indications of driver profitability. Accordingly, the one or more score models 116 may calculate a score that estimates safety and/or revenue. In some embodiments, one score model 116 may be trained to calculate a safety score, and another score model 116 may be trained to calculate a profitability score.

The profile computing platform 110 may train a score model 116 for estimating a safety score using training data that includes trip conditions data, mobility status data, driving data, trips data, passenger presence data, driver information data, history data, visited points of interest, and/or audio, video, and/or wireless signals captured by a shared mobility service application 153 for a large number of drivers. For example, the training data set may tend to indicate how safely the drivers were driving in various conditions, such as with or without passengers, during certain weather conditions, during certain road conditions, during the day versus at night, near points of interest, and in other such conditions. The indicators of safety may include accident data, tickets, license suspensions and/or cancellations, the cost of insuring a driver, and the like. In some embodiments, such a score model 116 may be trained to output a continuous value indicating an estimated shared mobility service insurance premium (e.g., in dollars) over a given period (e.g., monthly). Additionally or alternatively, a score model 116 may be trained to output a discrete value indicating, for example, an estimated range of an insurance premium (e.g., in dollars) over a given period (e.g., monthly). For example, the model may classify a driver or rider into one of 5 discrete insurance premium ranges.

In some embodiments, profile computing platform 110 may train a plurality of score models 116 for estimating a safety level in various weather, traffic, and time conditions. For example, profile computing platform 110 may train one score model 116 for calculating a safety score during the daytime, one score model 116 for calculating a safety score at night, one score model 116 for calculating a safety score during snowy weather, one score model 116 for calculating a safety score in heavy traffic, and the like. The profile computing platform 110 may train such conditions-specific models by restricting the training data (e.g., such as the trips data) to data correlating with the condition in question and/or by weighting such training data more heavily. For example, profile computing platform 110 may train a score model 116 for calculating a safety score in light traffic by looking only at training data corresponding to time periods when drivers were driving in light traffic and/or by weighting such training data more heavily than other training data.

In some embodiments, profile computing platform 110 may train a plurality of score models 116 for estimating a safety level in various mobility statuses. For example, profile computing platform 110 may train one score model 116 for calculating a safety score during the mobility status of "personal," one score model 116 for calculating a safety score during a mobility status of "no passengers," one score model for calculating a safety score during a mobility status of "heading to ride," and one score model 116 for calculating a safety score during a mobility status of "passengers." The profile computing platform 110 may train such status-specific models by restricting the training data (e.g., such as the trips data) to data correlating with the mobility status in question and/or by weighting such training data more heavily.

The profile computing platform 110 may also train one or more score models 116 for estimating a driver's revenue using training data that includes trip conditions data, mobility status data, driving data, trips data, passenger presence data, driver information data, and/or driver history data for a large number of drivers. For example, the training data set may tend to indicate how much revenue the drivers were making in various conditions, such as during certain weather conditions, during certain road conditions, during the day versus at night, and in other such conditions. The indicators of driver revenue may include numbers of trips taken, revenue earned, and the like. In some embodiments, such a score model 116 may be trained to output a continuous value indicating an estimated shared mobility service revenue (e.g., in dollars) over a given period (e.g., monthly). Additionally or alternatively, a score model 116 may be trained to output a discrete value indicating, for example, an estimated range of revenues (e.g., in dollars) over a given period (e.g., monthly). For example, the model may classify a driver into one of 5 discrete revenue ranges.

In some embodiments, profile computing platform 110 may train a plurality of score models 116 for estimating a driver's revenue in various weather, traffic, and time conditions. For example, profile computing platform 110 may train one score model 116 for calculating a driver revenue score during the daytime, one score model 116 for calculating a driver revenue score at night, one score model 116 for calculating a driver revenue score during snowy weather, one score model 116 for calculating a driver revenue score in heavy traffic, and the like. The profile computing platform 110 may train such conditions-specific models by restricting the training data (e.g., such as the driving data) to data correlating with the condition in question and/or by weighting such training data more heavily. For example, profile computing platform 110 may train a score model 116 for calculating a driver revenue score in light traffic by looking only at training data corresponding to time periods when drivers were driving in light traffic (and/or by weighting such training data more heavily than other training data).

The profile computing platform 110 may also train one or more score models 116 for estimating scores for different personality factors using training data that includes trip conditions data, mobility status data, driving data (which may include data derived from sensor data, such as visited points of interest), trips data, passenger presence data, driver information data (e.g., the gestures, moods, and other attributes determined from recorded video, audio, and wireless data), and/or driver history data for a large number of riders or drivers. For example, the training data set may tend to indicate whether the drivers or riders exhibited different personality factors. The indicators of different personality factors may include surveys, psychological assessments, and other such measures of the riders and drivers. In some embodiments, such a score model 116 may be trained to output a continuous value indicating an estimated personality score. Additionally or alternatively, a score model 116 may be trained to output a discrete value indicating, for example, whether a driver or rider has an attribute or not.

Accordingly, at step 216, profile computing platform 110 may use the trip conditions data, the mobility status data, the driving data (which may include data derived from sensor data, such as visited points of interest), the trips data, the passenger presence data, the driver and/or rider information data (which may include, e.g., the gestures, moods, and other attributes determined from recorded video, audio, and wireless data), the history data, and/or the audio, video, and/or wireless signals captured by the shared mobility service application 153 obtained at step 202, step 203, step 209, step 210, step 213, step 214, and/or step 215 as inputs to the one or more score models 116 to determine one or more scores for a driver or rider. In some embodiments, profile computing platform 110 may extract features from the trip conditions data, the mobility status data, the driving data, the trips data, the passenger presence data, the driver information data, the history data, and/or the audio, video, and/or wireless signals captured by the shared mobility service application 153 before using the features as inputs to the one or more score models 116 to calculate the scores. In some embodiments, the one or more score models 116 may also output a confidence level. The confidence level may reflect a relatively lower or higher confidence based, for example, on an amount of trip conditions data, mobility status data, driving data, trips data, passenger presence data, driver information data, and/or driver history data that was input to the model, on a similarity between the input information and training data used to train the one or more models, and the like.

In some embodiments, profile computing platform 110 may calculate multiple scores using multiple score models 116. Then, profile computing platform 110 may combine the scores to form one or more composite scores. For example, profile computing platform 110 may average the safety and revenue scores to form a composite profitability score. In some instances, profile computing platform 110 may combine a safety score scaled to estimate a dollar cost of insuring the driver (e.g., the score may be a negative number estimating a monthly insurance premium) with a revenue score scaled to estimate the driver's revenue in dollars (e.g., the score may be a positive number estimating monthly revenue). The profile computing platform 110 may combine the scores using addition or subtraction to yield a composite score that predicts a driver's future revenues less insurance costs.

The profile computing platform 110 may further add, remove, change, or otherwise update one or more attributes associated with the driver or rider (and/or a vehicle) based on the trip conditions data, the mobility status data, the driving data (which may include data derived from sensor data, such as visited points of interest), the trips data, the passenger presence data, the driver information data (which may include, e.g., the gestures, moods, and other attributes determined from recorded video, audio, and wireless data), the history data, and/or the audio, video, and/or wireless signals captured by the shared mobility service application 153. For example, based on captured audio data indicating that a rider talks frequently, the profile for the rider may be tagged with an "extroverted" attribute. As another example, based on captured video data indicating that a driver often makes certain gestures while driving, the driver may be tagged with a "disagreeable" attribute. As a third example, based on driving and/or trips data, a driver may be tagged with a "cautious driver" attribute. As another example, based on the driver or rider frequently visiting a movie theater point of interest, the driver or rider may be tagged with a "movie buff" attribute.

Figure 2E:
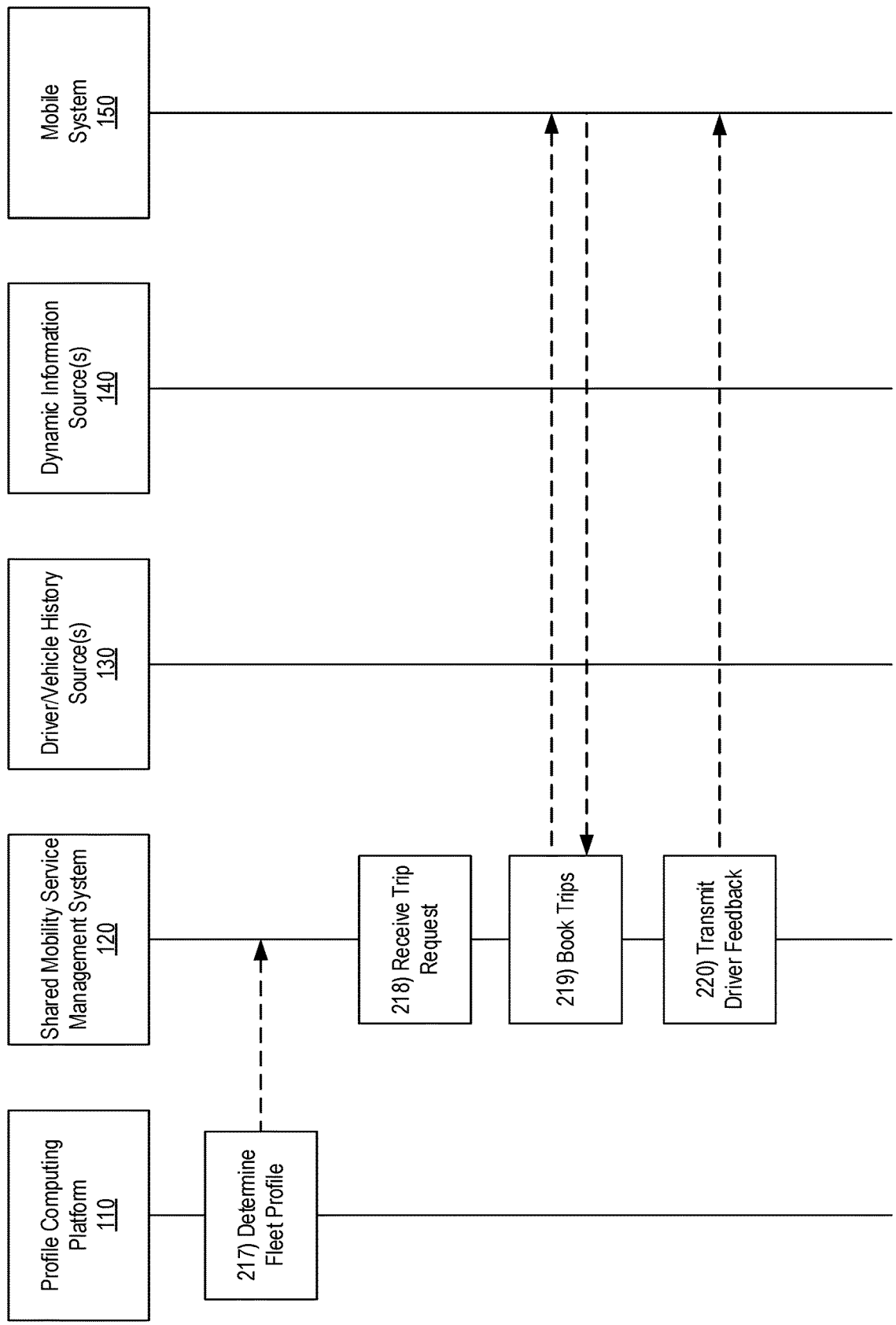

Referring to FIG. 2E, at step 217, profile computing platform 110 determines a fleet profile for some or all of the drivers associated with shared mobility service management system 120 based on scores associated with respective drivers. For example, profile computing platform 110 may generate an average score for the fleet. As another example, profile computing platform 110 may determine average scores for different weather, traffic, and time conditions in order to provide information about the safety, revenue, and/or other aspects of fleet effectiveness for different conditions. In some embodiments, profile computing platform 110 may rank each driver of the fleet based on a respective score associated with each driver (e.g., based on any of the scores of the drivers' profiles, such as a composite score estimating driver profitability). Additionally or alternatively, profile computing platform 110 may generate multiple driver rankings based on multiple scores, such as a safety score ranking and/or a revenue score ranking. In some embodiments, profile computing platform 110 may generate the rankings based on current conditions, such that the rankings reflect drivers' scores in snowy weather when it is snowing, reflect drivers' scores at night when it is night, and the like. The profile computing platform 110 may transmit the fleet profile information (including the one or more rankings) to the shared mobility service management system 120, which may responsively display the fleet profile information.

In some embodiments, at step 217, profile computing platform 110 may further determine which driver attributes caused a high or low score for a given driver. For example, profile computing platform 110 may analyze the one or more models 116 to determine which variables are most predictive of high and/or low scores. The profile computing platform 110 may associate the high and/or low values of such variables with one or more attributes that indicate the reasons for their high and/or low scores. For example, profile computing platform 110, after analyzing the models 116, may determine that a high average speed is a predictive variable for a low safety score. Then, profile computing platform 110 may determine that a "speeder" attribute indicates that the driver may have a low safety score due to speeding.

Figure 5:
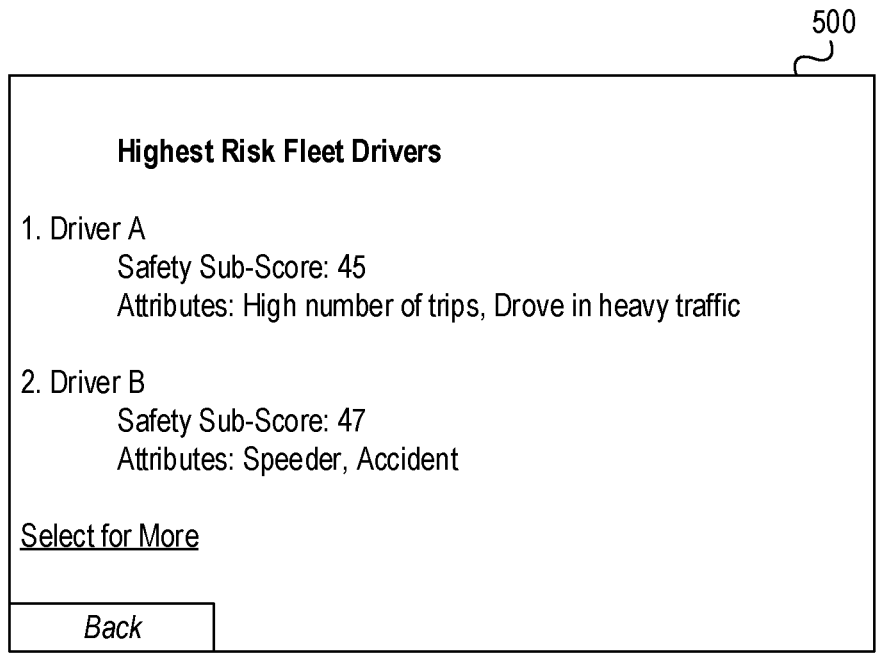
FIGS. 5 & 6 depict example graphical user interfaces for controlling vehicles in a shared mobility service based on scores and/or attributes in accordance with one or more example embodiments.

FIG. 5 illustrates a user interface 500 displaying an example driver ranking based on a safety score for each driver. As illustrated, the user interface 500 may be configured to display a "highest risk" ranking (e.g., based on safety scores). Accordingly, Driver A may be ranked first in the ranking due to having the lowest safety score of the fleet. In some embodiments, the displayed ranking information may include one or more attributes associated with the low safety score. For example, Driver A may have received a low safety score due to taking a high number of trips and driving in heavy traffic. As another example, Driver B may have low safety score due to speeding and being involved in a traffic accident. In some embodiments, some variables that cause a low safety score may be associated with a high revenue score. For example, taking a large number of trips and/or driving in heavy traffic may be predictive of a high revenue score and a low safety score. Conversely, some variables may be predictive of both a low safety score and a low revenue score. For example, speeding and/or being involved in an accident may cause both a low revenue score and a low safety score. The user interface 500 for displaying a safety ranking may distinguish between such variables. For example, the displayed reasons for Driver A (which may be predictive of high revenue) may be highlighted in one color (such as green), and the displayed reasons for Driver B (which may be predictive of low revenue) may be highlighted in another color (such as red).

With further reference to FIG. 2E, at step 218, shared mobility service management system 120 may receive a trip request from a rider. For example, the trip request may indicate a desired pickup location and a desired drop-off location for the rider.

At step 219, shared mobility service management system 120 may offer the opportunity to pick up the rider to one or more drivers. In some embodiments, the shared mobility service management system 120 may transmit a notification indicating the ride opportunity to a first driver. Shared mobility service application 153, running on a mobile system associated with the driver (e.g., one of mobile system 150, 160, or 170), may display the notification. The displayed notification may include options for accepting the ride or declining the ride. If the driver declines the ride, shared mobility service management system 120 may select a second driver and transmit a notification indicating the ride opportunity to the second driver. The shared mobility service management system 120 may proceed in this way until a driver accepts the ride.

In some embodiments, shared mobility service management system 120 may select the first driver, the second driver, and so on in an order based at least in part on the driver rankings of the fleet profile, a current location of each driver, a match between a profile of the driver and a profile of the new rider, a match between a profile of the new rider and a profile of one or more riders in the driver's vehicle, and/or a current availability associated with each driver (e.g., a number of seats available as determine at step 211). In some embodiments, the score-based rankings may be adjusted based on a profile match similarity (e.g., between a driver and a rider requesting a trip and/or between one or more current riders in a vehicle and a potential new rider for the same vehicle), such that drivers of vehicles associated with profiles that more closely match a new rider's profile may be ranked higher for a potential ride. Accordingly, profile computing platform 110 and/or shared mobility service management system 120 may dynamically generate driver rankings based on varying conditions (e.g., weather conditions) and based on data associated with potential rides (e.g., based on a rider profile).

In some embodiments, highly-ranked drivers (e.g., drivers with high scores and/or drivers with profiles that more closely match a new rider profile and/or drivers transporting riders with profiles that more closely match a new rider profile) may receive preferences for accepting rides. For example, if two available drivers are within a threshold distance of a rider requesting a ride, a higher-ranking driver may be given first choice for picking up the rider. In this example, the more highly-ranked driver may receive a notification of the ride opportunity before the lower-ranked driver. The lower-ranked driver may receive a notification of the ride opportunity if the higher-ranked driver declines the ride opportunity.

In some embodiments, higher-ranked drivers may have more time to accept a ride. For example, shared mobility service application 153 may, by default, display a notification of a ride opportunity for 10 seconds before automatically declining the ride opportunity. However, a highly-ranked driver (e.g., a driver associated with a score above a predetermined threshold, an above-average score, or the like) may receive extra time (e.g., 15 seconds) to decide whether to accept the ride opportunity.

In some embodiments, higher-ranked drivers may be matched with higher-rated riders. For example, when a higher-ranked driver and a lower-ranked driver are within a threshold distance of two riders requesting rides, the higher-ranked driver may receive a notification indicating a ride opportunity with the higher-rated rider, and the lower-ranked driver may receive a notification indicating a ride opportunity with the lower-rated rider.

In some embodiments, riders may be preferentially matched with drivers and/or other riders having similar profiles. For example, if a rider has a large number of attributes in common with a driver, the driver may receive a preference for picking up the rider. Additionally or alternatively, a driver may receive a preference for picking up a second rider when a first rider in the driver's vehicle shares a number of attributes with the second rider (e.g., as in a carpool).

In some embodiments, higher-ranked drivers may be associated with a greater radius for determining ride opportunities. For example, the shared mobility service management system 120 may, by default, offer a ride opportunity for the available driver that is closest to a requesting rider. However, a higher-ranked driver may be associated with a distance multiplier (e.g., 1.2 times), and shared mobility service management system 120 may divide the higher-ranked driver's distance from the rider by the increased distance multiplier for purposes of determining the nearest available driver. Accordingly, a higher-ranked driver with a 1.2 distance multiplier at a distance of 1.1 kilometers from a rider may receive a first opportunity over a lower-ranked driver with a 1.0 distance multiplier at a distance of 1.0 kilometers from the rider (e.g., because a distance of 1.1/1.2 is less than 1.0/1.0).

As discussed above, in some embodiments, profile computing platform 110 and/or shared mobility service management system 120 may rank drivers dynamically based on current conditions data. For example, at night, profile computing platform 110 and/or shared mobility service management system 120 may rank drivers based on a night-driving score. Similarly, during rainy weather, profile computing platform 110 and/or shared mobility service management system 120 may rank drivers based on a rainy-driving score, during heavy-traffic periods, profile computing platform 110 and/or shared mobility service management system 120 may rank drivers based on a heavy-traffic score, and the like. In these embodiments, shared mobility service management system 120 may provide trip booking preferences to drivers based on the conditions-specific ranking and/or based on other rankings. Accordingly, drivers may receive preferences during some conditions, but not during others, based on conditions-specific driver rankings.

In some embodiments, drivers may receive a percentage of a fare based on the one or more safety scores for different mobility statuses associated with a potential trip. For example, if a trip will cause a driver to drive 1 mile to pick up a passenger, then drive 5 miles with the passenger, the driver's percentage of the fare may be calculated based a driver's safety score for a "heading to ride" mobility status for the 1-mile portion of the trip and based on the driver's safety score for a "passengers" mobility status for the 5-mile portion of the trip. The shared mobility service management system 120 may determine the portions of the trip, then calculate the fare percentage based on the driver's safety score for the various mobility statuses associated with the different portions of the trip. For example, if a driver's safety score for a "heading to ride" mobility status is below average, a default fare percentage or amount may be adjusted downwards in proportion to the amount of the potential trip that will be spend in the "heading to ride" status. Additionally or alternatively, if the driver's safety score for a "passengers" mobility status is above average, the fare percentage or amount may be adjusted upwards in proportion to the amount of the potential trip that will be spend in the "passengers" status. Accordingly, in some embodiments, drivers with higher safety scores may receive an increased percentage of a rider fare. For example, by default, a shared mobility service company may pay a driver 75% of a fare. However, due to one or more safety scores that are above or below average and/or above or below one or more predetermined thresholds, the percentage may be increased or decreased (e.g., to 76% or 74%).

In some embodiments, the shared mobility service management system 120 may calculate a cost to insure the driver for each portion of a potential trip, based on the associated driver safety score for various mobility statuses. The shared mobility service management system 120 may then determine a total cost of insuring the driver for the entire trip (e.g., by adding the costs for each portion of the trip). The shared mobility service management system 120 may then calculate a default fare amount for the trip (e.g., based on the estimated distance and/or duration of the trip, a congestion factor, and the like). The shared mobility service management system 120 may then adjust the default amount of the fare to be awarded to the driver based on the calculated cost of insuring the driver for the entire trip (e.g., by subtracting the cost from the default fare amount).

In some embodiments, the shared mobility service management system 120 may calculate a cost per mile to insure the driver for different mobility statuses. For example, a driver may be associated with a $1/mile cost for a mobility status of "personal," a $0.50/mile cost for a mobility status of "no passengers," a $3.50/mile cost for a mobility status of "heading to ride" (e.g., because the driver is known to speed during this mobility status), and a $1/mile cost for a mobility status of "passengers." The shared mobility service management system 120 may calculate the cost per mile based on a safety score for each mobility status. The shared mobility service management system 120 may use the cost per mile for each mobility status to determine a cost to insure the driver for each portion of a trip and/or the cost to insure the driver for the total trip. The shared mobility service management system 120 may further use such cost information to determine a percentage or amount of a fare to provide to a driver (e.g., by subtracting the total cost from a base fare to yield a fare to be paid to a driver).

In some embodiments, a rider fare may also be adjusted up or down based on a match between the profile of the rider and the profile(s) of the driver and/or one or more other riders. For example, when the rider shares a threshold number of attributes in common with the driver and/or other riders, the price of the ride may be increased (e.g., to reflect the additional value to the rider of a pleasant ride). The shared mobility service management system 120 thus may adjust pricing based on attribute matches between one or more riders and/or a driver.

In some embodiments, a driver's percentage of a fare may be increased and/or a rider's fare may be decreased based on certain attribute conflicts with one or more other riders and/or driver of a vehicle. For example, a rider having an attribute of "extroverted" may receive a lower fare to ride with a driver having an attribute of "introverted," due to the conflicting attributes. The shared mobility service management system 120 thus may adjust pricing based on attribute conflicts between one or more riders and/or a driver.

In some embodiments, a fare and/or a driver's percentage of the fare may be increased or decreased based on one or more attributes of a vehicle associated with the driver. For example, fares may be adjusted upwards for newer, more expensive, better-maintained, or otherwise better vehicles. Similarly, a driver's percentage may be reduced for older, more poorly-maintained, or otherwise worse vehicles.

In some cases, such as for shared mobility services using autonomous vehicles, no driver may be present, and shared mobility service management system 120 may select a vehicle to pick up a potential rider based on several factors, including a vehicle profile, and rider profiles for any passengers already riding in the vehicle, as well as other factors such as location, route, and the like. For example, shared mobility service management system 120 may select a first autonomous vehicle to pick up a first rider requesting a ride over a second autonomous vehicle based on the first autonomous vehicle carrying a second rider that has one or more attributes in common with, or lacks attribute conflicts with, the first rider.

At step 220, shared mobility service management system 120 may transmit driver feedback information to the driver and/or cause the driver feedback information to be displayed by a mobile system associated with the driver. The driver feedback information may include indications of the driver's score and/or how the driver can improve the driver's score.

Figure 6:
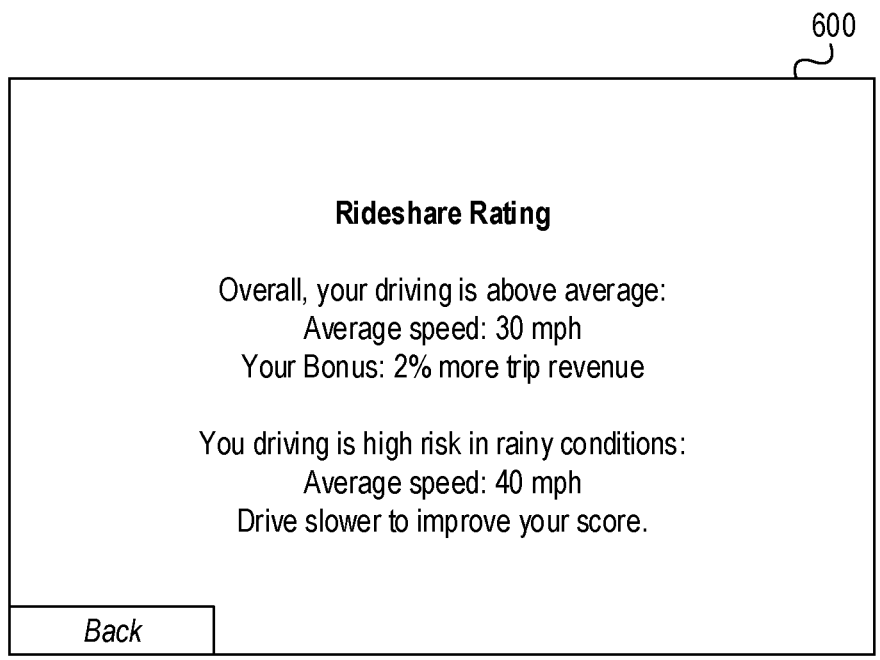

FIG. 6 illustrates an example user interface 600 for displaying driver feedback to a driver (e.g., via display 156 of mobile system 150). As illustrated, the user interface 600 may include an indicator of a driver's overall score. The user interface 600 may further include indications of one or more input variables that affect the driver's score (e.g., an average speed). The user interface 600 may further display one or more indications of booking preferences based on a driver's score. For example, the user interface 600 may display an indication that the driver will receive 2% more of a rider's fare.

Additionally or alternatively, the user interface 600 may display one or more indicators of a conditions-specific score. The user interface 600 may display an indicator of a driver's score in specific conditions, such as rainy conditions. In the illustrated example, the user interface 600 may display an indication that the driver's safety score is below a threshold in some conditions (e.g., indicating a high risk). The user interface 600 may, in some embodiments, display a plurality of such indicators corresponding to a plurality of different conditions. As before, the user interface 600 may further display indications of one or more input variables that affected the driver's conditions-specific score (e.g., an average speed). Additionally or alternatively, if a driver's scores are below a threshold, suggestions for improving the scores and/or may be displayed by user interface 600. Such suggestions may be selected based on input variables that cause a low score. For example, when a driver is associated with a high average speed, a suggestion of driving more slowly may be displayed.

Figure 7:
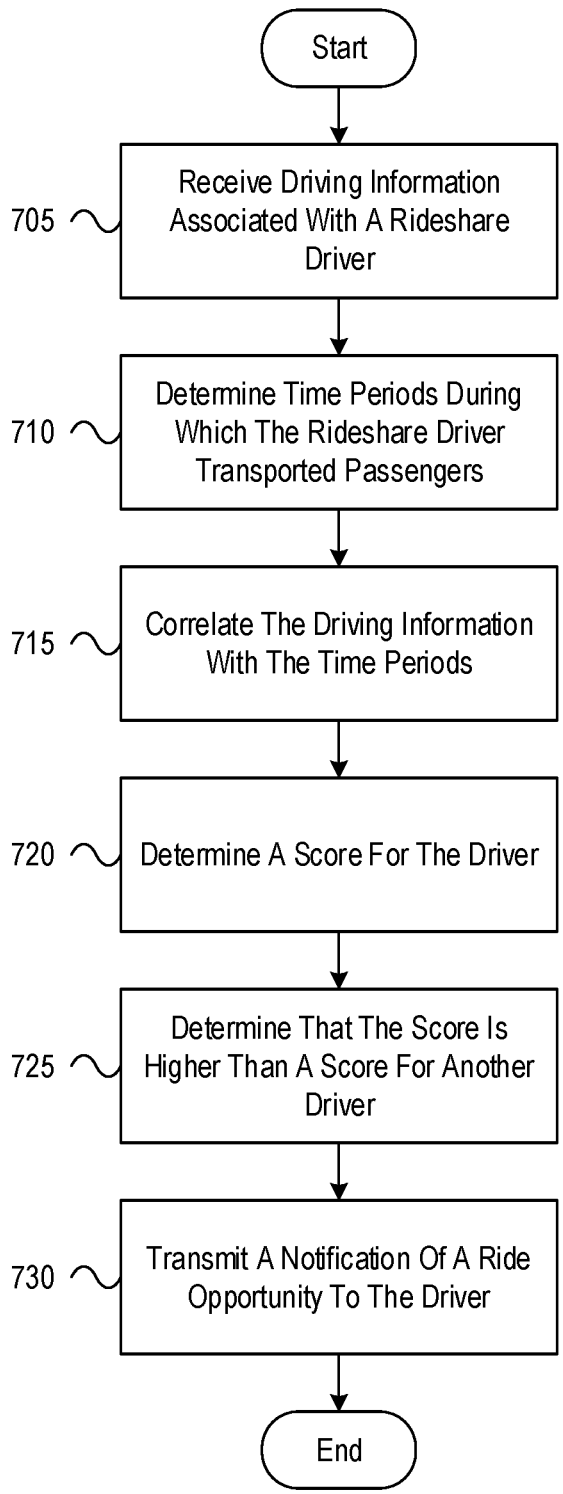
FIG. 7 depicts an illustrative method for controlling vehicles in a shared mobility service based on scores and/or attributes in accordance with one or more example embodiments.

FIG. 7 depicts an illustrative method for managing a shared mobility service based on scores in accordance with one or more example embodiments. At step 705, a shared mobility service management computing platform may receive driving information associated with a first driver of a shared mobility service. At step 710, the shared mobility service management computing platform may determine one or more time periods during which the first driver was transporting at least one rider of the shared mobility service. At step 715, the shared mobility service management computing platform may correlate the driving information with the one or more time periods. At step 720, the shared mobility service management computing platform may determine, based on the correlation, a first score for the first driver. At step 725, the shared mobility service management computing platform may determine that the first score for the first driver is higher than a second score for a second driver. At step 730, the shared mobility service management computing platform may, responsive to the determining of step 725, transmit a notification of a ride opportunity to the first driver.

The systems and methods described herein beneficially incentivize vehicles of a shared mobility service to drive safely and efficiently. By collecting information about potential drivers and providing an initial score before hiring a driver, the systems and methods allow a shared mobility service to screen for drivers that will transport riders safely and effectively. Then, by monitoring driving and/or trips information in various contexts, and with respect to whether riders are present or not, the systems and methods described herein may continue to monitor whether a driver transports riders safely and effectively, both overall and in various traffic, weather, and road conditions. The shared mobility service can then optimize the matching of riders to drivers to ensure that riders will be transported safely and effectively based on current conditions. Moreover, by providing specific feedback on the scores to the drivers, systems and methods described herein incentivize drivers to improve the safety and effectiveness of their driving.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure

What is claimed is:

1. A method comprising:
   at a shared mobility service management computing platform comprising at least one processor, memory, and a communication interface:
   receiving, by the at least one processor, via the communication interface, driving information associated with a first driver of a shared mobility service, the driving information based on processed sensor data received from one or more sensors in proximity of a vehicle associated with the first driver during driving;
   determining, by the at least one processor, one or more first time periods when the first driver was transporting at least one passenger by detecting at least one indicator of the at least one passenger, the at least one indicator being a recorded voice of the at least one passenger, a recorded video of the at least one passenger, or a recorded passive wireless signal of a passenger device associated with the at least one passenger, wherein the one or more first time periods are associated with a passenger mobility status;
   determining at least one of one or more second time periods when the first driver is not transporting at least one passenger and waiting for a ride associated with a waiting mobility status, one or more third time periods when the first driver is heading towards a ride associated with a ride-bound mobility status, or one or more fourth time periods when the first driver is driving on personal time associated with a personal mobility status;
   filtering, by the at least one processor and based on at least one of the at least one indicator of the at least one passenger or trip data, the driving information to obtain a first subset of the driving information associated with the one or more first time periods and at least one of a second subset of the driving information associated with the one or more second time periods, a third subset of the driving information associated with the one or more third time periods, or a fourth subset of the driving information associated with the one or more fourth time periods;
   using a first machine learning model to generate, by the at least one processor, based on the first subset of the driving information, a first safety score indicating a level of safety of the first driver during the one or more first time periods based on at least the processed sensor data, wherein the first machine learning model is trained by trip data that correlates to the passenger mobility status;
   using at least one of a second machine learning model, a third machine learning model, or a fourth machine learning model to generate, by the at least one processor, a second safety score indicating a level of safety during the one or more second time periods, a third safety score indicating a level of safety during the one or more third time periods, a fourth safety score indicating a level of safety during the one or more fourth time periods, respectively, based on at least the processed sensor data, wherein the second machine learning model is trained by trip data that correlates to the waiting mobility status, wherein the third machine learning model is trained by trip data that correlates to the ride-bound mobility status, and wherein the second machine learning model is trained by trip data that correlates to the personal mobility status;
   setting different insurance costs per mile for the first driver between when the first driver is transporting at least one passenger and at least one of waiting for a ride, heading toward a ride, or driving on personal time, based on the first safety score and at least one of the second safety score, the third safety score, or the fourth safety score, respectively; and determining, by the at least one processor, based on the first safety score, a percentage of a fare to award to the first driver.

2. The method of claim 1, further comprising:
receiving, by the at least one processor, during the one or more first time periods in which the first driver was transporting the at least one passenger associated with the shared mobility service, a recorded audio signal of the at least one passenger; and
analyzing, by the at least one processor, the recorded audio signal to detect a voice of a passenger associated with the shared mobility service.

3. The method of claim 2, wherein the analyzing of the recorded audio signal to detect the voice of the passenger associated with the shared mobility service comprises:
determining, based on one or more acoustic properties of the recorded audio signal, whether the recorded audio signal contains a media program; and
detecting the voice of the passenger associated with the shared mobility service responsive to determining that the recorded audio signal does not contain a media program.

4. The method of claim 2, wherein the analyzing of the recorded audio signal to detect the voice of the passenger associated with the shared mobility service comprises:
generating, by the at least one processor, from the recorded audio signal, a first voice print;
comparing, by the at least one processor, the first voice print to a second voice print associated with the first driver; and
determining, by the at least one processor, based on the comparison, that the first voice print does not match the second voice print.

5. The method of claim 1, further comprising:
after receiving the wireless signal, analyzing, by the at least one processor, the wireless signal to determine a number of mobile devices present in the vehicle.

6. The method of claim 1, further comprising:
determining, by the at least one processor, that the first driver is within a threshold distance of a pickup location associated with a ride opportunity.

7. The method of claim 1, further comprising:
determining, by the at least one processor, a number of passengers associated with the shared mobility service inside the vehicle associated with the first driver.

8. The method of claim 1, further comprising:
transmitting, by the at least one processor, via the communication interface, to a mobile system associated with the first driver, an indication of the first safety score and a recommendation for improving the first safety score.

9. The method of claim 1, further comprising:
determining, based on the driving information, an attribute characterizing the first driver.

10. The method of claim 9, further comprising: increasing, based on a determination that a potential passenger associated with a ride opportunity is also associated with the attribute, a percentage of a fare awarded to the first driver.

11. The method of claim 1, further comprising:
determining a similarity between a first profile of a potential passenger associated with a ride opportunity and a second profile of a current passenger being transported by the first driver; and
determining, based on the similarity, a fare for the potential passenger.

12. A computing platform comprising:
at least one processor;
a communication interface communicatively coupled to the at least one processor; and
memory storing computer-readable instructions that, when executed by the at least one processor, cause the computing platform to:
receive, via the communication interface, driving information associated with a first driver of a shared mobility service, the driving information comprising processed sensor data received from one or more sensors in proximity of a vehicle associated with the first driver during driving;
determine one or more first time periods when the first driver was transporting at least one passenger via detection of at least one indicator of the at least one passenger, the at least one indicator being a recorded voice of the at least one passenger, a recorded video of the at least one passenger, or a recorded passive wireless signal of a passenger device associated with the at least one passenger, wherein the one or more first time periods are associated with a passenger mobility status;
determine at least one of one or more second time periods when the first driver is not transporting passengers and waiting for a ride associated with a waiting mobility status, one or more third time periods when the first driver is heading towards a ride associated with a ride-bound mobility status, one or more fourth time periods when the first driver is driving on personal time associated with a personal mobility status;
filter, based on at least one of the detected wireless signal of the passenger device and trip data, the driving information to obtain a first subset of the driving information associated with the one or more first time periods and at least one of a second subset of the driving information associated with the one or more second time periods, a third subset of the driving information associated with the one or more third time, and a fourth subset of the driving information associated with the one or more fourth time periods;
use a first machine learning model to generate, by the at least one processor, based on the first subset of the driving information, a first safety score indicating a level of safety of the first driver during the one or more first time periods based on at least the processed sensor data, wherein the first machine learning model is trained by trip data that correlates to the passenger mobility status;
use at least one of a second machine learning model, a third machine learning model, or a fourth machine learning model to generate, by the at least one processor, a second safety score indicating a level of safety during the one or more second time periods, a third safety score indicating a level of safety during the one or more third time periods, a fourth safety score indicating a level of safety during the one or more fourth time periods, respectively, based on at least the processed sensor data, wherein the second machine learning model is trained by trip data that correlates to the waiting mobility status, wherein the third machine learning model is trained by trip data that correlates to the ride-bound mobility status, and wherein the second machine learning model is trained by trip data that correlates to the personal mobility status;

set different insurance costs per mile for the first driver between when the first driver is transporting at least one passenger and at least one of waiting for a ride, heading toward a ride, or driving on personal time, based on the first safety score and at least one of the second safety score, the third safety score, or the fourth safety score, respectively; and determine, by the at least one processor, based on the first safety score, a percentage of a fare to award to the first driver.

13. The computing platform of claim 12, wherein the computer-readable instructions further cause the computing platform to:

receive, during the one or more first time periods in which the first driver was transporting the at least one passenger associated with the shared mobility service, a recorded audio signal of the at least one passenger; and analyze the recorded audio signal to detect a voice of a passenger associated with the shared mobility service.

14. The computing platform of claim 13, wherein the computer-readable instructions that cause the computing platform to analyze the recorded audio signal to detect a voice of the passenger associated with the shared mobility service comprise computer-readable instructions that cause the computing platform to:

generate, by the at least one processor, from the recorded audio signal, a first voice print;

compare, by the at least one processor, the first voice print to a second voice print associated with the first driver; and determine, by the at least one processor, based on the comparison, that the first voice print does not match the second voice print.

15. The computing platform of claim 13, wherein the computer-readable instructions that cause the computing platform to analyze the recorded audio signal to detect a voice of the passenger associated with the shared mobility service comprise computer-readable instructions that cause the computing platform to:

determine, based on one or more acoustic properties of the recorded audio signal, whether the recorded audio signal contains a media program; and detect the voice of the passenger responsive to determining that the recorded audio signal does not contain a media program.

16. The computing platform of claim 12, wherein the computer-readable instructions further cause the computing platform to, after receiving the wireless signal, analyze the wireless signal to determine a number of mobile devices inside the vehicle.

17. One or more non-transitory computer-readable media storing instructions that, when executed by a computing platform comprising at least a processor, memory, and a communication interface, cause the computing platform to:

receive, via the communication interface, driving information associated with a first driver of a shared mobility service, the driving information comprising processed sensor data received from one or more sensors in proximity of a vehicle associated with the first driver during driving;

determine one or more first time periods when the first driver was transporting at least one passenger via detection of at least one indicator of the at least one passenger, the at least one indicator being a recorded voice of the at least one passenger, a recorded video of the at least one passenger, or a recorded passive wireless signal of a passenger device associated with the at least one passenger, wherein the one or more first time periods are associated with a passenger mobility status;

determine at least one of one or more second time periods when the first driver is not transporting passengers and waiting for a ride associated with a waiting mobility status, one or more third time periods when the first driver is heading towards a ride associated with a ride-bound mobility status, one or more fourth time periods when the first driver is driving on personal time associated with a personal mobility status;

filter, based on at least one of the detected wireless signal of the passenger device and trip data, the driving information to obtain a first subset of the driving information associated with the one or more first time periods and at least one of a second subset of the driving information associated with the one or more second time periods, a third subset of the driving information associated with the one or more third time, and a fourth subset of the driving information associated with the one or more fourth time periods;

using a first machine learning model to generate, by the at least one processor, based on the first subset of the driving information, a first safety score indicating a level of safety of the first driver during the one or more first time periods based on at least the processed sensor data, wherein the first machine learning model is trained by trip data that correlates to the passenger mobility status;

using at least one of a second machine learning model, a third machine learning model, or a fourth machine learning model to generate, by the at least one processor, a second safety score indicating a level of safety during the one or more second time periods, a third safety score indicating a level of safety during the one or more third time periods, a fourth safety score indicating a level of safety during the one or more fourth time periods, respectively, based on at least the processed sensor data, wherein the second machine learning model is trained by trip data that correlates to the waiting mobility status, wherein the third machine learning model is trained by trip data that correlates to the ride-bound mobility status, and wherein the second machine learning model is trained by trip data that correlates to the personal mobility status;

setting different insurance costs per mile for the first driver between when the first driver is transporting at least one passenger and at least one of waiting for a ride, heading toward a ride, or driving on personal time, based on the first safety score and at least one of the second safety score, the third safety score, or the fourth safety score, respectively; and determining, by the at least one processor, based on the first safety score, a percentage of a fare to award to the first driver.

18. The one or more non-transitory computer-readable media of claim 17, wherein the computer-readable instructions further cause the computing platform to:

receive, during the one or more first time periods in which the first driver was transporting the at least one passenger associated with the shared mobility service, a recorded audio signal of the at least one passenger; and analyze the recorded audio signal to detect a voice of a passenger associated with the shared mobility service.

19. The one or more non-transitory computer-readable media of claim 18, wherein the computer-readable instructions that cause the computing platform to analyze the recorded audio signal to detect a voice of the passenger associated with the shared mobility service comprise computer-readable instructions that cause the computing platform to:
- generate, from the recorded audio signal, a first voice print;
- compare the first voice print to a second voice print associated with the first driver; and
- determine, based on the comparison, that the first voice print does not match the second voice print.

\* \* \* \* \*